US011917244B2

(12) United States Patent
Gupta

(10) Patent No.: US 11,917,244 B2
(45) Date of Patent: Feb. 27, 2024

(54) RESOURCE-SAVING SYSTEMS AND METHODS

(71) Applicant: Rovi Guides, Inc., San Jose, CA (US)

(72) Inventor: Vikram Makam Gupta, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/974,263

(22) Filed: Oct. 26, 2022

(65) Prior Publication Data
US 2023/0070578 A1  Mar. 9, 2023

Related U.S. Application Data

(63) Continuation of application No. 17/085,101, filed on Oct. 30, 2020, now abandoned.

(51) Int. Cl.
| | | |
|---|---|---|
| *H04N 21/443* | (2011.01) | |
| *H04N 21/258* | (2011.01) | |
| *H04N 21/262* | (2011.01) | |
| *H04N 21/437* | (2011.01) | |

(52) U.S. Cl.
CPC ... *H04N 21/4436* (2013.01); *H04N 21/25825* (2013.01); *H04N 21/26216* (2013.01); *H04N 21/437* (2013.01)

(58) Field of Classification Search
CPC ......... H04N 21/4436; H04N 21/25825; H04N 21/26216; H04N 21/437
See application file for complete search history.

(56) References Cited

U.S. PATENT DOCUMENTS

| | | | |
|---|---|---|---|
| 10,951,679 B2 | 3/2021 | Corley et al. | |
| 11,382,043 B1 | 7/2022 | Oroskar et al. | |
| 2002/0141650 A1 | 10/2002 | Keeney et al. | |
| 2004/0125877 A1 | 7/2004 | Chang et al. | |
| 2009/0287841 A1 | 11/2009 | Chapweske et al. | |
| 2014/0136727 A1 | 5/2014 | Lim et al. | |
| 2016/0037176 A1 | 2/2016 | Chari | |
| 2016/0246351 A1 | 8/2016 | Joseph et al. | |
| 2017/0171271 A1 | 6/2017 | Kelly et al. | |
| 2018/0203662 A1* | 7/2018 | Liu | G06F 3/0488 |
| 2018/0254959 A1* | 9/2018 | Mantyjarvi | G06F 3/04883 |
| 2018/0286355 A1 | 10/2018 | Kim et al. | |
| 2020/0007955 A1 | 1/2020 | Mathur | |
| 2020/0168176 A1* | 5/2020 | Chen | G06F 3/012 |

(Continued)

FOREIGN PATENT DOCUMENTS

WO  2019178716 A1  9/2019

OTHER PUBLICATIONS

PCT International Search Report for International Application No. PCT/US2020/067294, dated Jul. 29, 2021 (12 Pages).

*Primary Examiner* — Mulugeta Mengesha
(74) *Attorney, Agent, or Firm* — Haley Guiliano LLP

(57) ABSTRACT

Methods and systems for saving resources when outputting a media asset such as a video are provided. The media asset is split into a first portion with a first importance and a second portion with the second importance. The first portion is displayed with a first set of output parameters (e.g., resolution, bit rate, frame rate, display size) and the second portion is displayed with a second set of output parameters that correspond to a lower quality than the first set of output parameters (e.g., a lower resolution, a lower bit rate, a lower frame rate, a lower display size).

20 Claims, 14 Drawing Sheets

(56) References Cited

U.S. PATENT DOCUMENTS

2021/0092494 A1  3/2021  Mao et al.
2021/0152892 A1  5/2021  Ramaswamy
2022/0141531 A1  5/2022  Gupta

* cited by examiner

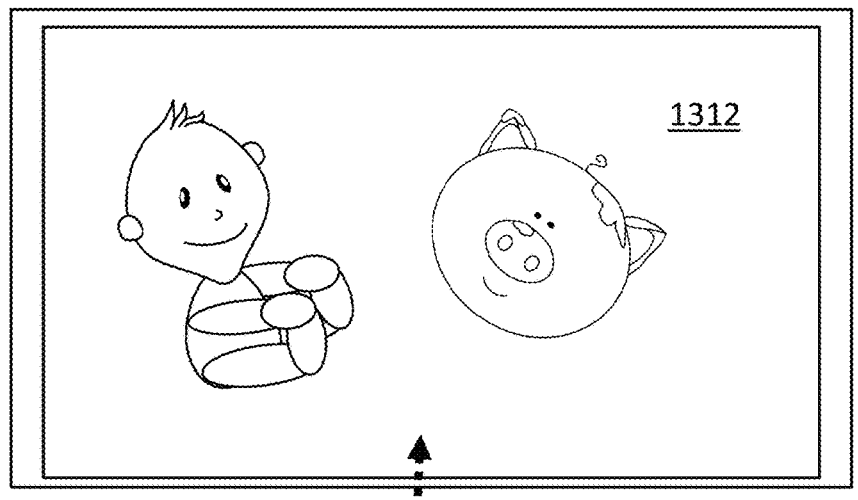
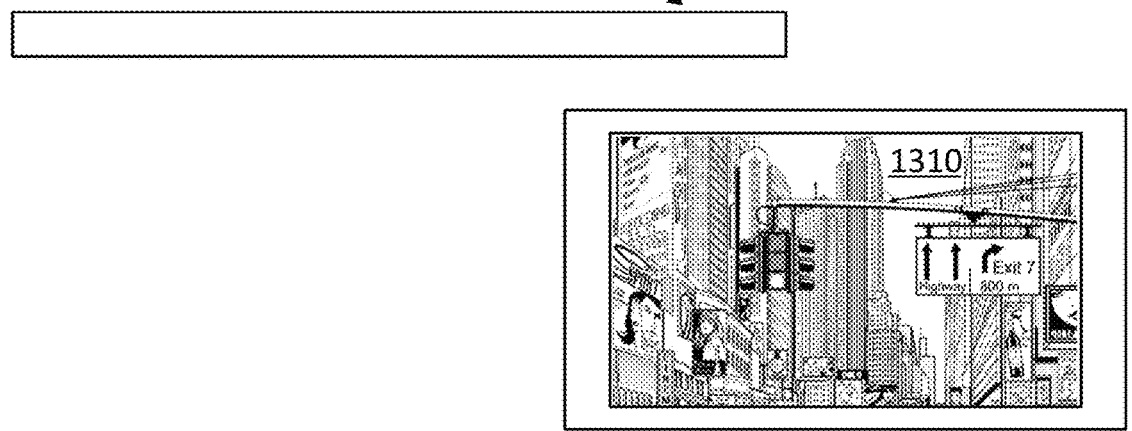
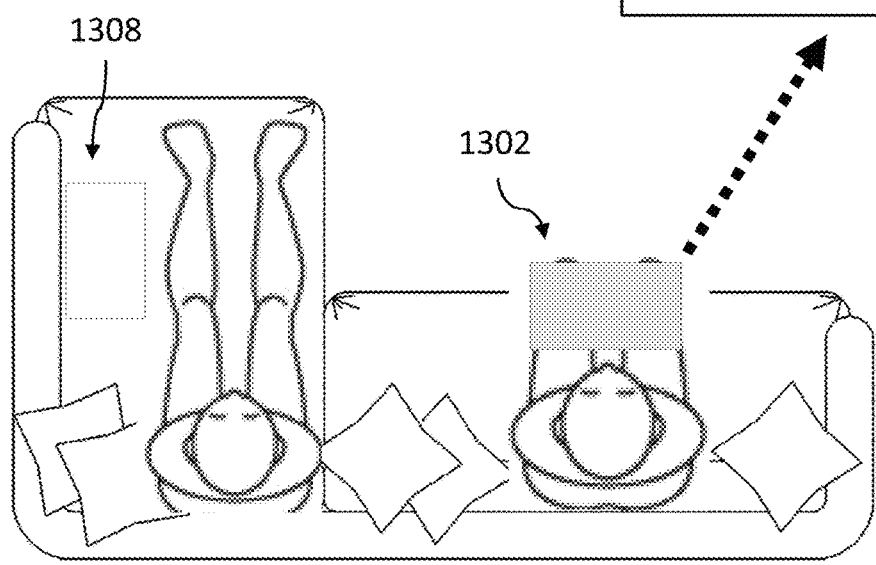
FIG. 13

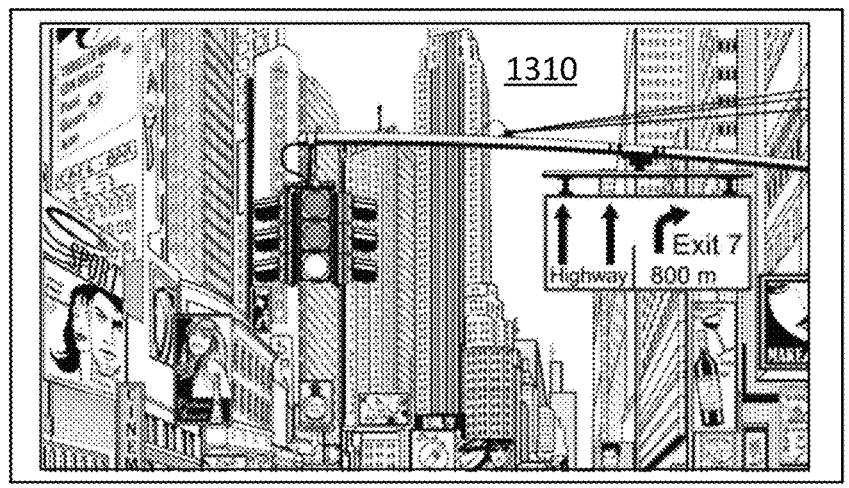
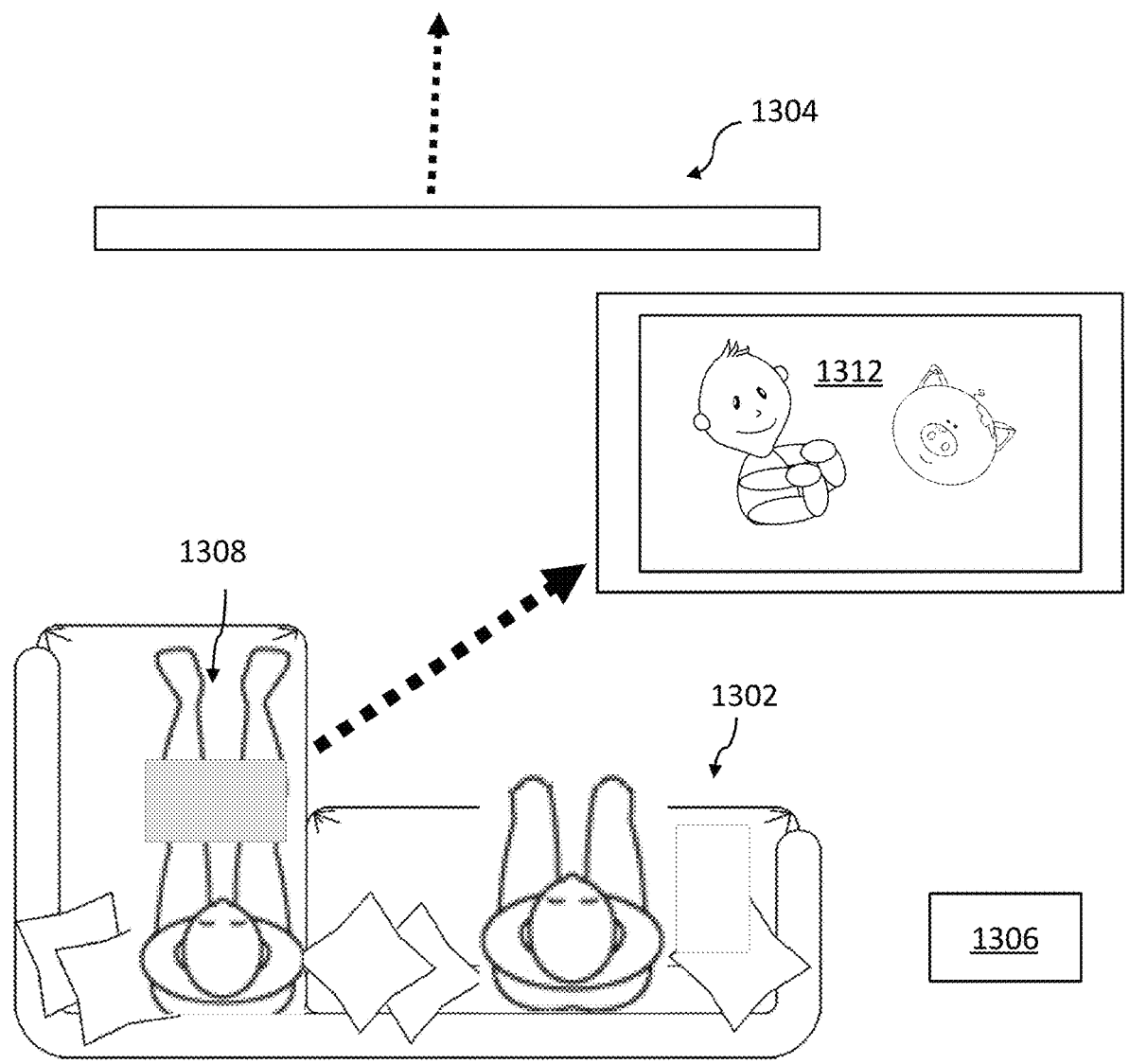
FIG. 14

RESOURCE-SAVING SYSTEMS AND METHODS

CROSS-REFERENCE TO RELATED APPLICATION

This application is a continuation of U.S. patent application Ser. No. 17/085,101, filed Oct. 30, 2020, the disclosure of which are hereby incorporated by reference herein in their entireties.

BACKGROUND

The present disclosure relates to resource-saving systems and methods to display media content (video and/or audio) on an electronic user device such as a smartphone, tablet, smart TV, laptop, computer, phablet, e-reader, etc.

Today a more and more common use of devices is to consume media assets, such as video content and/or audio content. That consumption necessitates different types of resources. For instance, to stream a media asset (e.g., movie, TV show, series) from a remote server (e.g., video-on-demand, pay-per-view, etc.), sufficient network bandwidth is required; or, when the user device is portable (e.g., smartphone, tablet, laptop, etc.), a battery with a sufficient capacity to accommodate the user's uses, such as watching media assets on public transportation, is required. However, media assets may be viewable with a high quality, which leads to transmission through the network, and handling by the user device, of a lot of data which may saturate the bandwidth or drain the battery of the user device.

Solutions exist to optimize the battery while interacting with a device. For example, document US 2018/286355 discloses, in a mobile terminal, a power-saving mode which is initiated when the remaining battery power of the mobile terminal is below a threshold. The power-saving mode may alter the resolution of an application executed by the mobile terminal.

It is against this background that embodiments of the present invention have arisen.

SUMMARY

There is a need for improved resource-saving modes, which may alleviate the constraints that playing a media asset on a user device may exert on an network (e.g., network's bandwidth or capacity) or on a battery of the user device.

In some approaches described herein, a resource-saving system may be activated to decrease consumption of resources, such as bandwidth and power, related to a user device (e.g., a smartphone or a set-top box) that is playing a media asset (e.g., a video) by means of an output device (e.g., a screen of a smartphone or a television connected to a set-top box). The resource-saving system may retrieve an input indicating that a media asset is to be output or is being output by the user device on the output device. The resource-saving system may determine that a portion of the media asset has a first attribute (referred to as the first portion), and that another portion of the media asset has a second attribute (referred to as the second portion). Based on those portions, the resource-saving system may generate for display, with a first set of output parameters, the first portion of the media asset and may generate for display, with a second set of output parameters, the second portion of the media asset. Each set of output parameters may include a resolution, a bitrate, a frame rate, or a display size on the output device. The second set of output parameters is different from the first set of output parameters. In an embodiment, the second set of output parameters corresponds to a lower-quality output than the first set of output parameters. For instance, at least one of the values of the output parameters of the second set of output parameters is lower than the value of the corresponding output parameter of the first set of output parameters. For instance, the first resolution may be 1920×1080 and the second resolution may be 1280×720; the first frame rate may be 60 FPS (frames per second) and the second frame rate may be 25 FPS; the first bitrate may be between 4500 and 6000 kbps (kilobits per second) and the second bitrate may be between 2500 and 4000 kbps; the first display size may be 16×9 cm or the second display size may be 8×4.5 cm. Thus, the amount of data the user device must process to play the second portion of the media asset is decreased compared to the amount of data for the first portion. The energy and/or bandwidth required by the user device and/or the output device to display the second portion is consequently decreased.

According to the present disclosure, the shift of quality is performed taking into account the content of the media asset: the first portion (i.e., a portion with the first attribute) is played with the first set of output parameters and the second portion (i.e., a portion with the second attribute) is played with the second set of output parameters. Therefore, the optimization of the resources may not only consider a level of battery or available bandwidth but also the content of the media asset. Portions with the first attribute may relate to critical moments of the media asset (for the plot, for the emotions, etc.) for which a high quality of display is preferable, while portions with the second attribute may relate to less critical moments of the media asset (such as a romance scene, a transition scene, etc.) for which a lower quality of display is acceptable. The attribute may therefore be a label representing an importance of the portion in the media asset (first importance for the first portion with the first attribute and second importance for the second portion with the second attribute). The first portion and the second portion may each be scattered throughout the media asset. The determination of the first portion and the second portion may be based on metadata of the media asset (e.g., the media asset producer generates the metadata and incorporates them in the media asset, or the resource-saving system analyses, beforehand or on the fly, the content of the media asset to attribute metadata) and on a user's profile. For instance, a user's profile indicating that the user loves action movies and does not watch romance movies may lead the resource-saving system to mark a car chase as a first portion (that is to say a portion with the first attribute) and a romance scene as a second portion (that is to say a portion with a second attribute). The car chase will be displayed with the first set of output parameters (i.e., a higher quality) and the romance scene with the second set of output parameters (i.e., a lower quality).

In an approach, when the media asset is received from a remote media asset provider or from a storage of a user device, the resource-saving system may receive, for the first portion, a media stream with a first quality, that permits the output device to display the first portion with the first set of output parameters and may receive, for the second portion, a media stream with the first quality as well. However, the resource-saving system may process the media stream with the first quality to display the second portion with the second set of output parameters. Indeed, to output a media asset, the user device usually needs to decode (part of the codec process) the received media stream. Doing so consumes CPU or GPU resources. However, the consumption of the CPU or GPU depends on the quality of the final display. Therefore, processing the media stream with the first quality to play the media asset with a lower quality (i.e., the second set of output parameters) consumes less battery than processing the media stream with the first quality to play the media asset with a higher quality (i.e., the first set of output parameters). This is particularly advantageous when the user device and/or the output device is powered by a battery. In this approach, the media asset may be provided by a remote media asset provider (e.g., remote streaming services on a remote server device) or may be already stored on a memory of the user device.

In an approach, when the media asset is received from a remote media asset provider, the second set of output parameters may permit a decrease in the amount of data going through a communication network that links the user device to the remote media asset provider. In this regard, the generating for output, with the second set of output parameters, the second portion of the media asset may comprise receiving, from the remote media asset provider, a media stream with a second quality, that contains enough data to play the media asset with the second set of output parameters but not enough data to play the media asset with the first set of output parameters. For instance, with such an approach, a family with a plurality of user devices may more easily and more fairly share the bandwidth of their internet connection. This approach also permits reduction of the CPU or GPU consumption of the user device, as the media stream with the second quality is less demanding to process than the media stream with the first quality and is advantageous for battery-powered user devices.

In an approach, the set of output parameters includes a display size (e.g., a display area, for instance indicated by values for the length and the width of the display size, or a single dimension such as the diagonal) and the display size of the second set of output parameters is smaller than the display size of the first set of output parameters. This means that the display size on the screen of the second portion of the media asset is smaller than a display size on the screen of the first portion. For instance, on a user device with a screen of 10×5 cm the first portion of the media asset may be displayed using the 10×5 cm (therefore the whole screen) and the second portion of the media asset may be displayed using 5×2.5 cm (therefore one quarter of the screen). This approach can conveniently be combined with a set of output parameters including the resolution as well, where the resolution of the second set of output parameters is inferior to the resolution of the first set of output parameters, as a lower resolution may be used for a smaller display size without significantly compromising on the quality of the image. For instance, on a user device with a output device (e.g., a screen) with a resolution of 1920×1080, the first portion of the media asset may be displayed in 1920×1080 (therefore every pixel of the screen is used), and the second portion of the media asset may be displayed in 1280×720, using only 1280×720 pixels of the output device. Therefore, there will be a fraction of the pixels of the output device that are not used to display the second portion. With some technologies (e.g., Amoled®), those unused pixels may be shut off, thereby saving power.

Depending on the approaches, the resource-saving system may be part of the user device or the remote server device of the media asset provider, or both.

Resource-saving mechanisms, techniques and systems are presently introduced to decrease the amount of data transferred over a network or to decrease the power consumption of a user device.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 13 is an illustrative representation of a process to save resources, at one stage of the process, in accordance with some other embodiments of the disclosure;

FIG. 14 is an illustrative representation of a process to save resources, at another stage of the process, in accordance with some other embodiments of the disclosure;

DETAILED DESCRIPTION

Methods and systems are disclosed herein to decrease consumption of resources related to a user device that outputs a media asset on an output device. Consumption of resources may relate to the amount of data received by the user device (therefore impacting the bandwidth of the network) and/or the amount of energy consumed by the user device to output the media asset so that a user can view and/or listen to it. That amount of energy may be consumed by the reception of data, the treatment of data and/or activation of pixels of a screen. A media asset may be a video asset (with or without sound), an audio asset or any type of content that a user can watch or with which a user can interact. The user device may be a smartphone, a tablet, a laptop, a phablet, a computer with a display, a television, a Smart TV, a set-top box, a video game console, etc.

Figure 1:
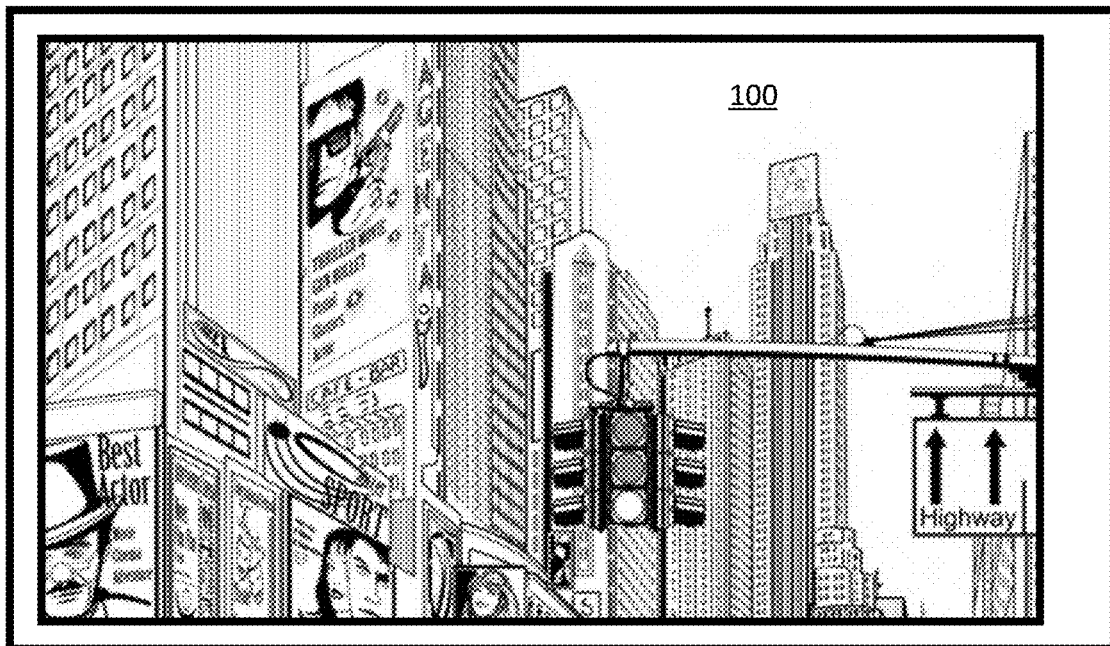
FIG. 1 is an illustrative representation of an output device that displays a first portion of the media asset, with a first set of output parameters (higher resolution), in accordance with some embodiments of the disclosure.
Figure 2:
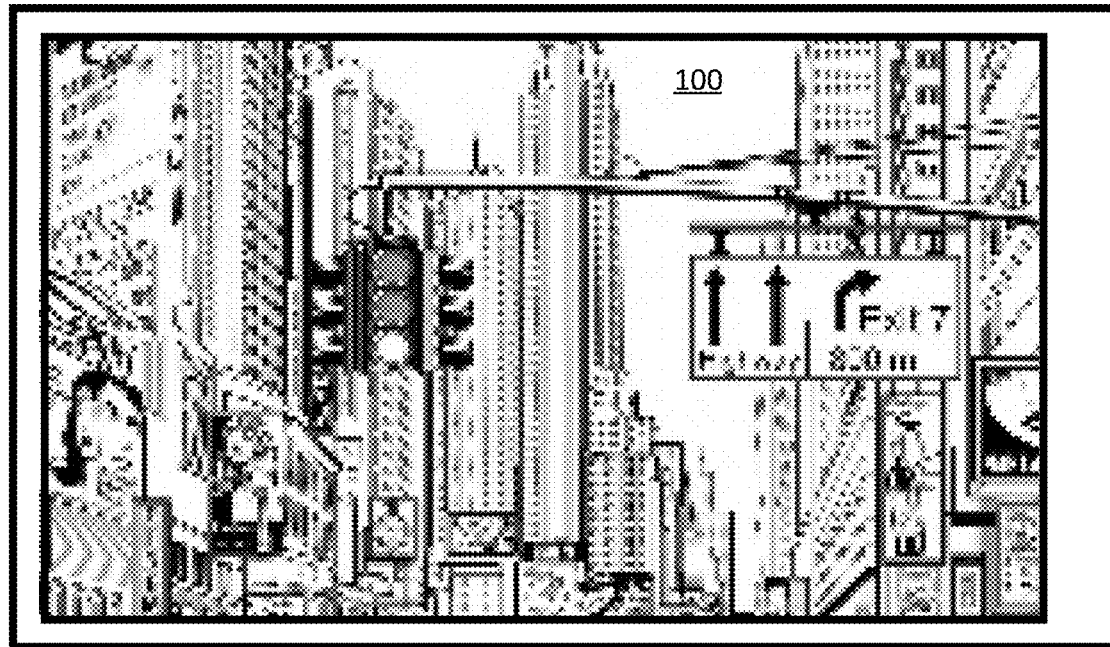
FIG. 2 is an illustrative representation of an output device which display a second portion of the media asset, with a second set of output parameters (lower resolution), in accordance with some embodiments of the disclosure.

FIGS. 1 and 2 show two representations of a media asset 100 that is being output on an output device 102 connected to a user device (not represented in FIGS. 1 and 2), in accordance with some embodiments of the present disclosure. A resource-saving system may be used to operate a resource-saving mode during which the consumption of resources is decreased in comparison with operating in a regular mode (e.g., when the resource-saving mode is deactivated). The resource-saving system may be part of the user device that generates for output the media asset, a remote server device that sends the media asset, or spread across both.

The resource-saving system may receive an input indicating that a media asset 100 is being output by the output device 102 of the user device or is to be output by the output device 102 of the user device. The input may include a selection of a media asset 100, performed by means of a user interface of the user device. The resource-saving system may determine that a first portion 104 of the media asset has a first attribute and that a second portion 106 of the media asset has a second attribute (for the rest of the description, a first portion is a portion of the media asset that has the first attribute and a second portion is a portion of the media asset that has the second attribute). In FIGS. 1 and 2, the first and second portions 104, 106 are shown as intervals on the media asset 100, which is itself represented by a seekbar 108 comprising a play position 110. The resource-saving system generates for output with a first set of output parameters, on the output device, the first portion 104 of the media asset 100 and it generates for output with a second set of output parameters, on the output device, the second portion 106 of the media asset 100. The set of output parameters relates to at least one parameter that affects the quality of the output of the media asset, as perceived by the user and objectively quantifiable. For instance, the set of output parameters may include a resolution of the media asset, a bit rate of the media asset, a frame rate of the media asset or a display size of the media asset on the user device. "First" parameter or "second" parameter will refer to a parameter of, respectively, the first set or the second set, for the rest of the description. The person skilled in the art may appreciate that other output parameters may be used.

The second set of output parameters is different from the first set of output parameters, i.e., at least one output parameter has a value that is different in the two sets of output parameters. In particular, at least one of the output parameters of the second set of output parameters has a value that is lower than that of a corresponding output parameter of the first set of output parameters, which means that the quality of the second set of output parameters is lower than that of the first set of output parameters. This ensures that less data needs to be transferred to and/or processed by the user device, and therefore saves resources. For instance, the second resolution may be lower than the resolution of the first set, the second bitrate may be lower than the first bitrate, the second frame rate may be lower than the first frame rate, and/or the second display size on the output device may be smaller than the first display size. On the illustrations of FIGS. 1 and 2, the second resolution is lower than the first resolution so that the output of the second portion 106 is more pixelized than the output of the first portion 104. This can be achieved in different ways that will be discussed below. For example, the user device may receive from a remote server a media stream with a first quality that enables the user device to output the media asset with the first set of output parameters, and the user device may receive from the remote server a media stream with a second quality that enables the user device to output the media asset with the second set of output parameters (and not with the first set of output parameters). The media stream with the second quality may be less resource-consuming, as it needs to convey less data (and thus uses less bandwidth). In another example, the media asset is stored at the user device and processing the media asset for output is performed differently for the first portion and the second portion so that less energy is needed to output the second portion (and thus uses less battery).

Figure 3:
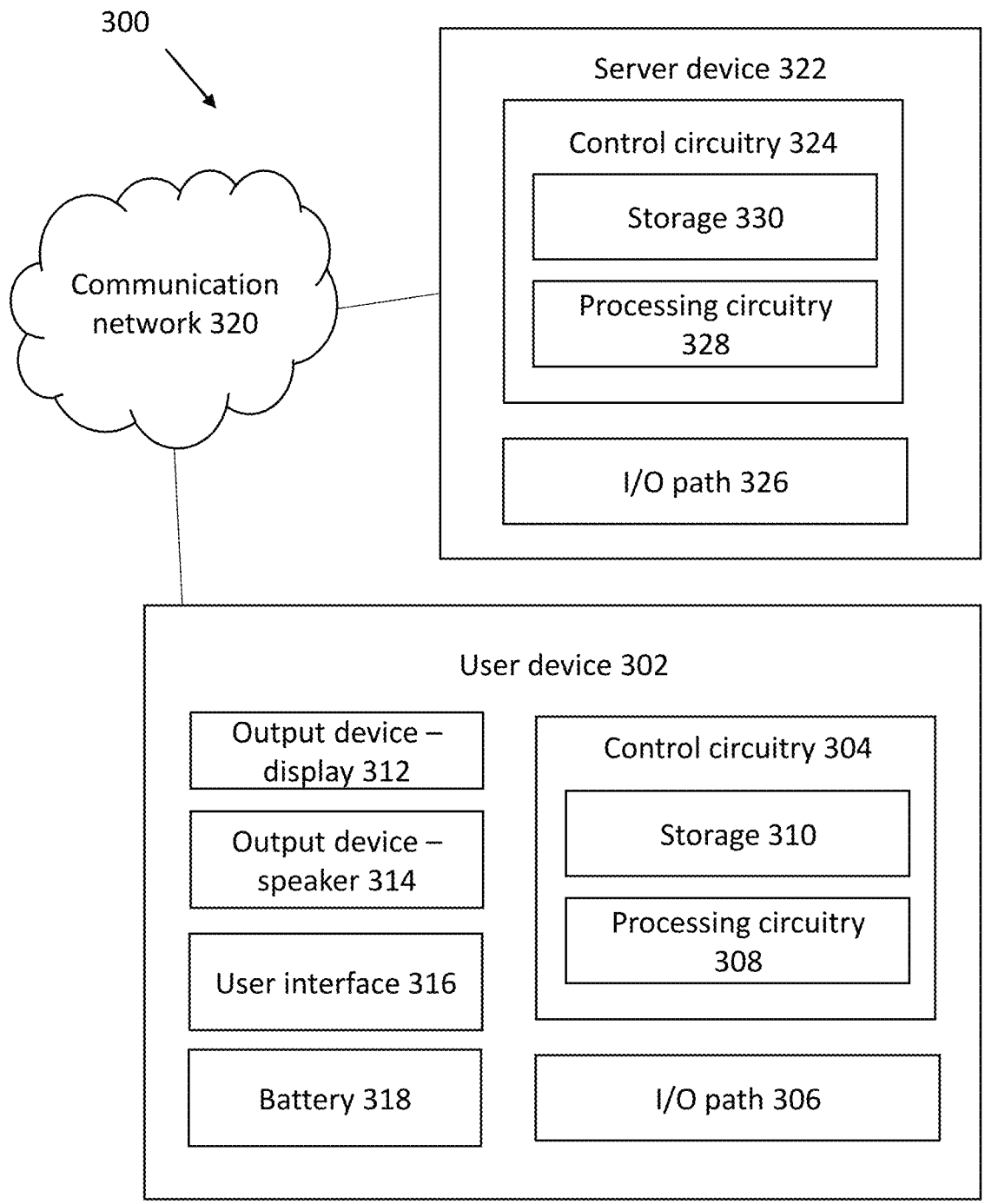
FIG. 3 is an illustrative topology of equipment (or computing configuration) programmed and configured for saving resources, in accordance with some embodiments of the disclosure.

FIG. 3 shows an illustrative block diagram of a computing configuration 300 that may include the resource-saving system presently described. Computing configuration 300 includes a user device 302. In some embodiments, the user device 302 may include control circuitry 304 and an input/output (I/O) path 306. Control circuitry 304 may include processing circuitry 308, and storage 310 (e.g., RAM, ROM, hard disk, removable disk, etc.). I/O path 306 may provide device information, or other data, over a local area network (LAN) or wide area network (WAN), and/or other content and data to control circuitry 304. Control circuitry 304 may be used to send and receive commands, requests, signals (digital and analog), and other suitable data using I/O path 306. I/O path 306 may connect control circuitry 304 (and specifically processing circuitry 308) to one or more communication paths.

User device 302 may include at least one output device, such as a display 312 (e.g., a screen) and/or a speaker 314, to output content visually and audibly. In addition, to interact with a user, user device 302 may include a user interface 316. The user interface 316 may include, for example, a touchscreen, mouse and/or keyboard. The user interface 316 is connected to the I/O path 306 and the control circuitry 304. In an embodiment, the user interface 316 may be a touchscreen enabling the user to provide input(s) to the user device. The display 312 may be a screen (such as a monitor or a TV). The user device 302 may be a smartphone, a tablet, an e-reader, a laptop, a smart TV, a phablet, etc. Alternatively, the output device and the user interface may be connected to the user device. In this case, the user device may be a set-top box, a computer tower, etc.

In an embodiment, the user device 302 comprises a battery 318, which is configured to provide energy (or power) to all the components of the user device 302 that require energy, such as the control circuitry 304 and the output device 312, 314.

Control circuitry 304 may be based on any suitable processing circuitry such as processing circuitry 308. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Memory may be an electronic storage device provided as storage 310, which is part of control circuitry 304. Storage 310 may store instructions that, when executed by processing circuitry 308, perform the processes described herein. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions). Storage 310 may be configured to store the media asset or at least to act as a buffer when the media asset is being streamed.

Computing configuration 300 may also include a communication network 320 and a server device 322. The user device 302 may be coupled to the communication network 320 to communicate with the server device 322. The communication network 320 may be one or more networks including the Internet, a mobile phone network, mobile voice or data network (e.g., a 5G, 4G or LTE network), mesh network, peer-to-peer network, cable network, or other types of communication network or combinations of communication networks.

In some embodiments, server device 322 may include control circuitry 324 and an input/output (I/O) path 326. Control circuitry 324 may include processing circuitry 328, and storage 330, which may similar to those already discussed in relation to the user device 302. Server device 322 may be a media asset provider for the user device 302, such as a streaming, VOD, or replay platform, etc.

The resource-saving system may comprise the user device 302 or the server device 322, in a client/server approach, depending on whether the media asset is being streamed from the server device 322 or being retrieved from the storage 310. Alternatively, the resource-saving system may be distributed over the user device 302 and the server device 322.

Figure 4:
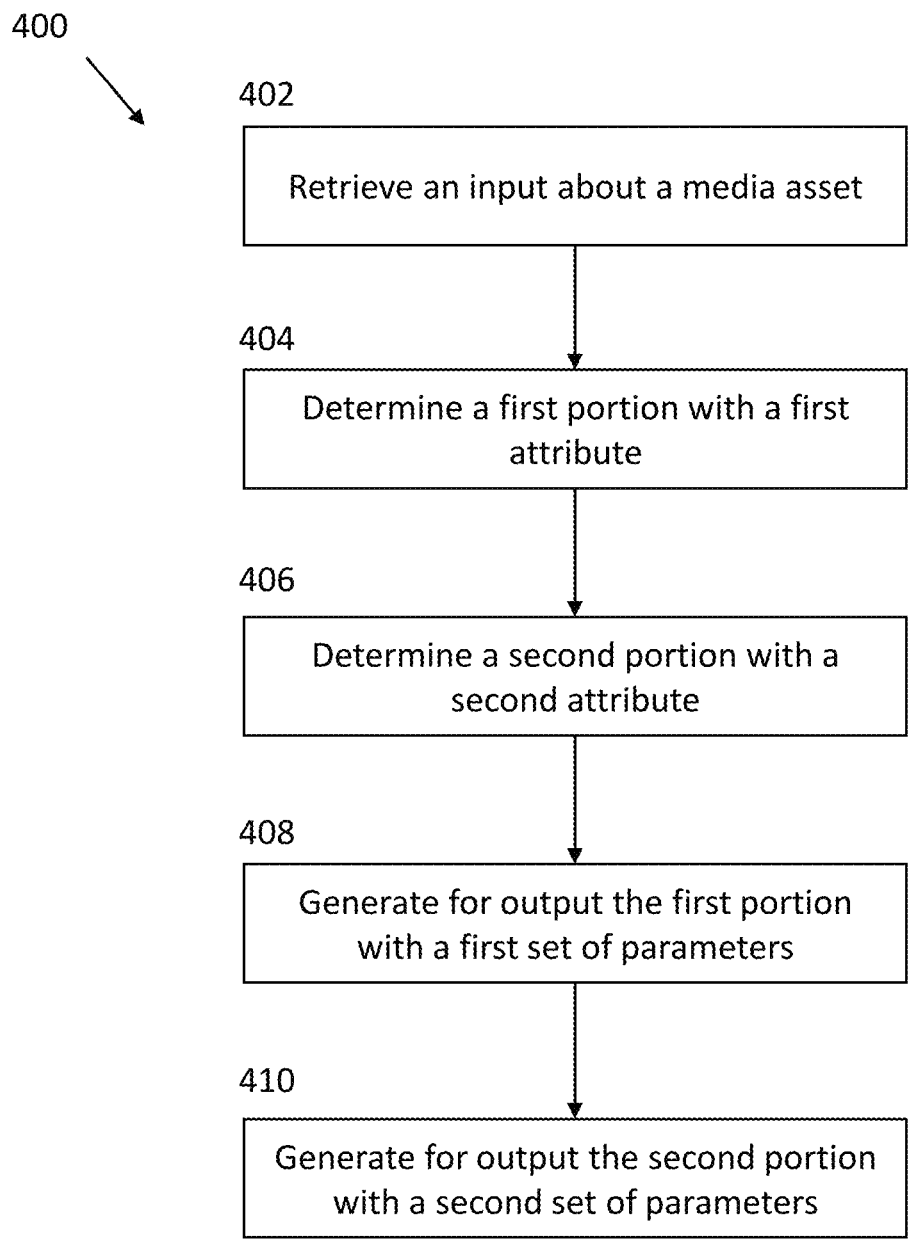
FIG. 4 is an illustrative flowchart of a process for saving resources, in accordance with some embodiments of the disclosure.

FIG. 4 is an illustrative flowchart of a process 400 for saving or decreasing resources related to the consumption of a media asset, in accordance with some embodiments of the disclosure. Unless specified otherwise, process 400, and any of the following processes, may be executed by any of control circuitry 304 or 322 or any combination thereof, using the communication network 318.

Figure 5:
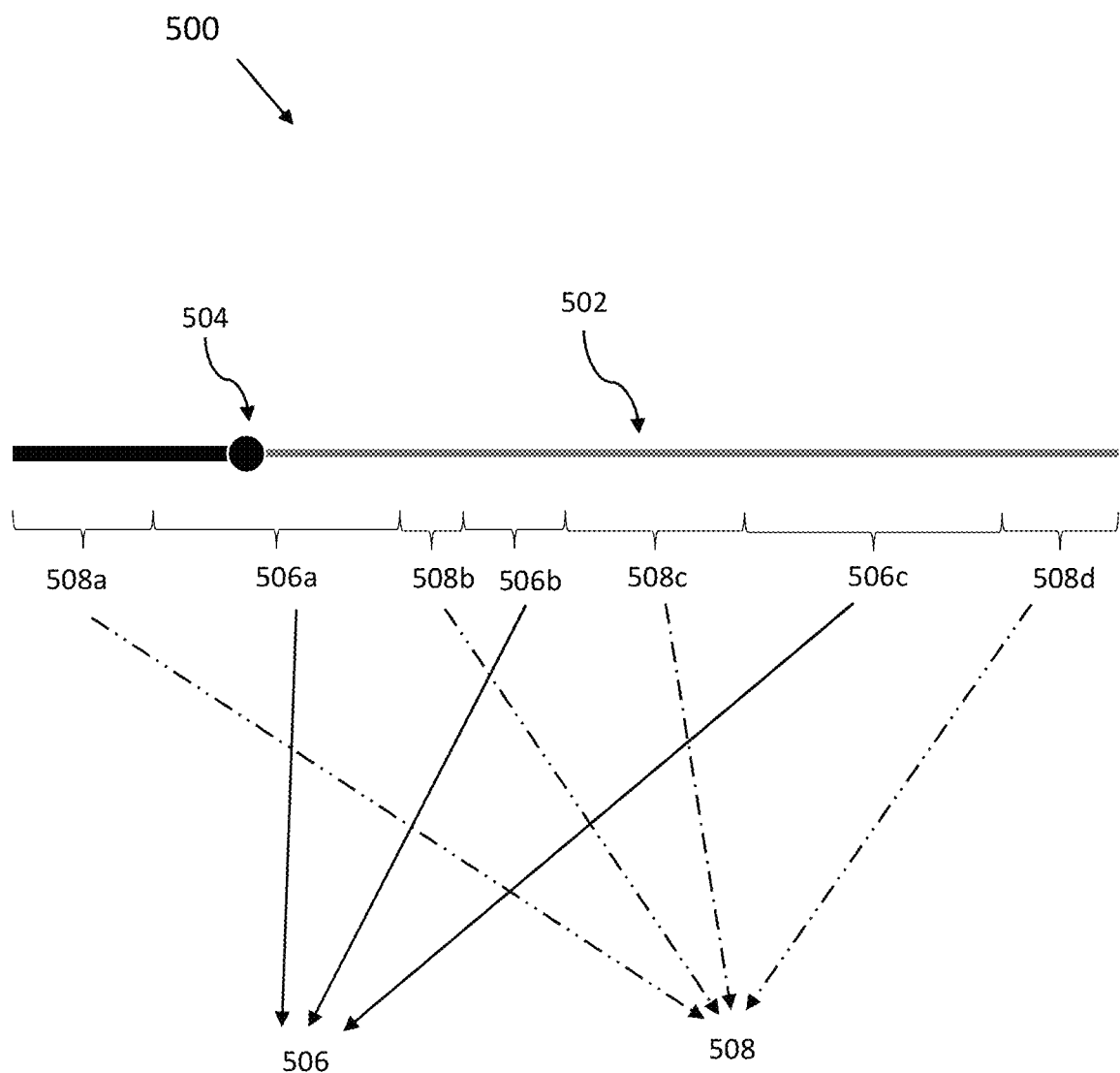
FIG. 5 is an illustrative diagram of the first and second portion of a media asset, in accordance with some embodiments of the disclosure.

Process 400 relates to a resource-saving mode that can be executed in certain situations. That will be discussed below. At step 402, control circuitry retrieves an input that a media asset is being or to be output by the user device 302 on an output device 312. As discussed above, the output device 312 may be part of the user device 302 (e.g., a screen of a smartphone) or separated therefrom (e.g., a television and a set top box). The input may come from the user device 302 itself, for instance from a media player or from an instruction to play a media asset (e.g., selecting a media asset by means of the user interface 316). At step 404, control circuitry determines that a portion of the media asset has a first attribute (referred to herein as "first portion") and, at step 406, control circuitry determines that another portion of the media asset has a second attribute (referred to herein as "second portion"). The first and second portions, as being determined for the media asset, are mutually exclusive. However, different divisions of the media asset are possible. Preferably, the whole media asset is split into a first portion and a second portion. The first portion and the second portion do not need to be continuous but may include a plurality of separated segments. For instance, the media asset may be split as a segment of the second portion from 00:00:00 (h:min:s) to 00:05:00 (e.g., the introduction of the media asset); then a segment of the first portion from 00:05:01 to 00:12:25 (e.g., a car chase in the media asset); then another segment of the second portion from 00:12:26 to 00:24:36 (e.g., a romance in the story); then another segment of the first portion from 00:24:36 to 00:24:59 (e.g., a naked scene in the romance), etc. In one embodiment, there are at least three alternations of segments during the media asset (a segment of one attribute, then a segment of the other attribute, then a segment of the former attribute). The number of alternations may be up to several dozen. FIG. 5 illustrates a media asset 500 by means of a seek bar 502 and a play position 504: the media asset 500 is split into a first portion 506 with several segments 506a, 506b, 506c and a second portion 508 with several segments 508a, 508b, 508c, 508d. For instance, segment 508a may be the introduction of the media asset and segment 508d may be the credits at the end of the media asset.

Control circuitry may determine the first portion and the second portion of the media asset using a user's profile and/or metadata of the media asset. The portions may be predetermined, before step 402, and the information is stored, for example on the storage 310 of the user device 302 or storage 330 of server device 322. Alternatively, the portions may be determined on the fly. Further details will be discussed below.

At step 408, control circuitry generates for output with a first set of output parameters, on the output device, the first portion of the media asset. This means that when the play position of the media asset is in the first portion, then the media asset is output with the first set of output parameters, as shown in FIG. 1. At step 410, control circuitry generates for output with a second set of output parameters, on the output device, the second portion of the media asset. This means that when the play position of the media asset is in the second portion, then the media asset is output with the second set of output parameters, as shown in FIG. 2.

The set of output parameters includes a resolution, a bitrate, a frame rate and a display size on the output device. For the first set of output parameters, a first resolution, a first bitrate, a first frame rate and a first display size are defined, and, for the second set of output parameters, a second resolution, a second bitrate, a second frame rate and a second display size are defined. In order to save resources, the second set of output parameters is different from the first set of output parameters. By different, it is understood that at least a value of one parameter of the second set of output parameters is different from a value of the same parameter in the first set of output parameters. In particular, the second set of output parameters is associated with an output of a lesser quality compared to the first set of output parameters. This means that at least one of the second resolution, second bitrate, second frame rate, and second display size has a lower value than the respective first resolution, first bitrate, first frame rate, and first display size. Any of the output parameters of the set of output parameters may be lower independently from the others, even though a lower resolution and/or a lower frame rate will also have an impact on the bitrate.

In an embodiment, as illustrated in FIGS. 1 and 2, the second resolution is lower than the first resolution. It is also noted here that the second display size is equal to the first display size. The image thus appears as pixelized in FIG. 2. In one approach, the second resolution is less than 60% of the number of pixels of the first resolution (i.e., ratio of second resolution/first resolution ≤60%). For instance the difference between a resolution of 240p (426×240) and 360p (640×360) is 44.4%, between 360p and 480p (854×480) is 56.2%, between 480p is 720p (1280×720) is 44.4%, between 720p and 1080p (1920×1080) is 44.4%, between 1080p and 1440p (2560×1440) is 56.3% and between 1440p and 2160p (3840×2160) is 44%.

In an embodiment, the second bitrate is lower than the first bitrate. In one approach, the second bitrate is less than 75% of the first bitrate (e.g., 3000 kbps and 4500 kbps or 4500 kbps and 6000 kbps). One way to lower the bitrate without lowering the other parameters of the set of output parameters is to alter the colors of the media asset or to have a better encoding algorithm.

In an embodiment, the second frame rate is lower than the first frame rate. In one approach, the second frame rate is less than 50% of the first frame rate (e.g., 24 images per second and 50 images per second). Common frame rates include 24, 25, 29.97, 30, 48, 50 and 60 images per second. Therefore, the first frame rate may be any of 25, 29.97, 30, 48, 50, 60 and the second frame rate may be any of 24, 25, 29.97, 30, 48, 50 that is lower than the first frame rate.

Figure 6:
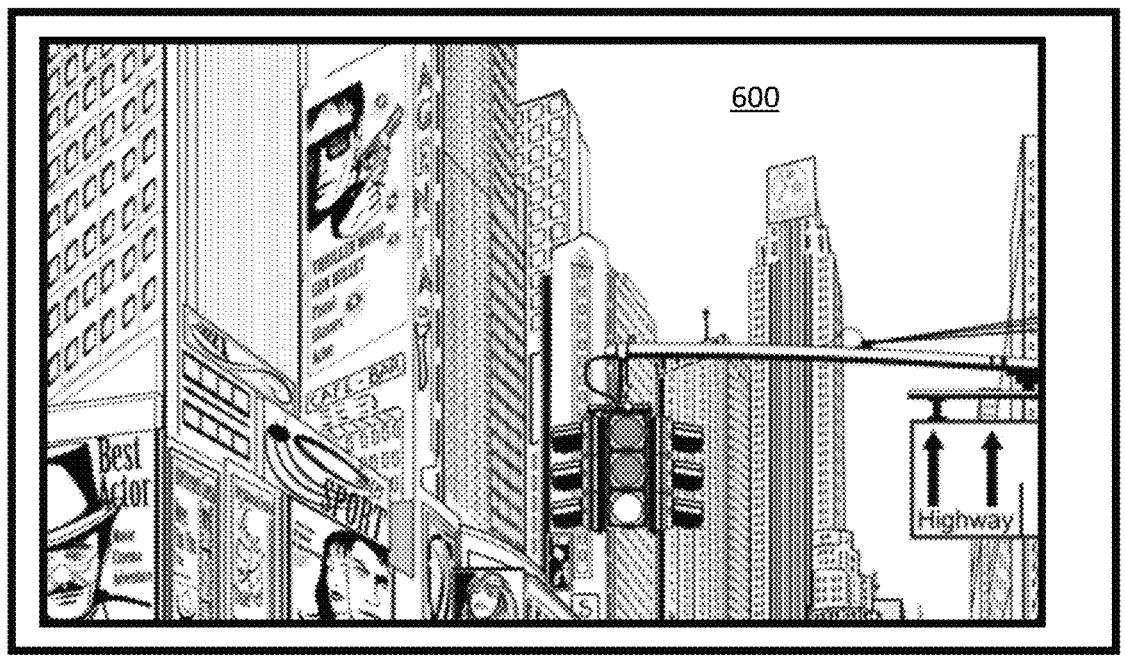
FIG. 6 is an illustrative representation of an output device that displays a first portion of the media asset with a first set of parameter (greater display size), in accordance with some embodiments of the disclosure.
Figure 7:
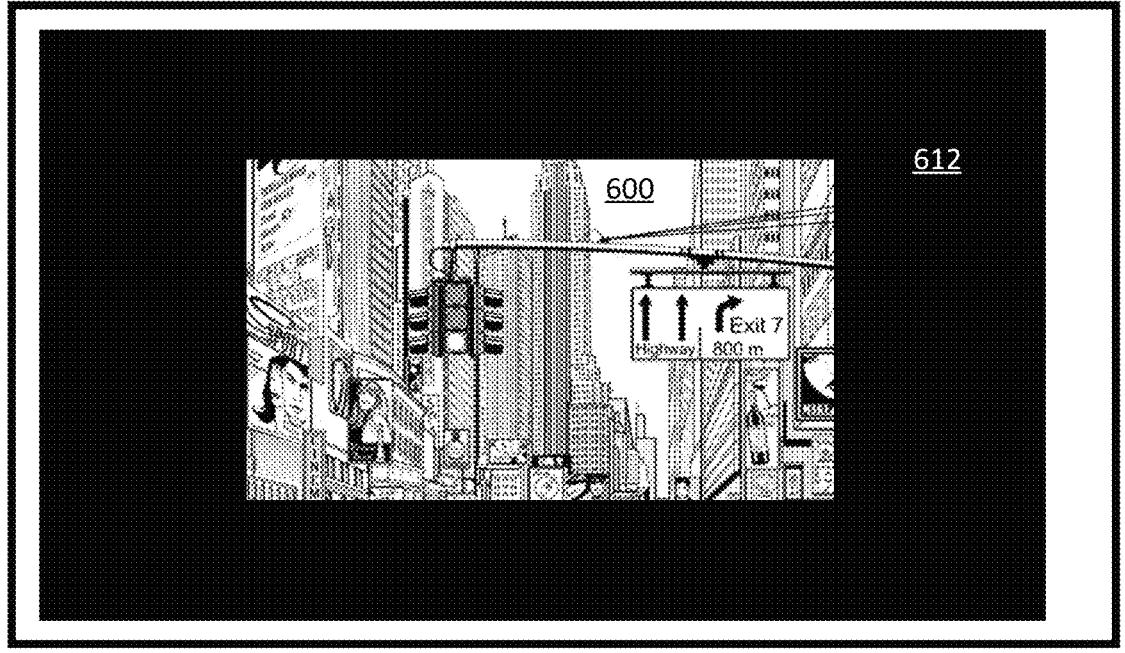
FIG. 7 is an illustrative representation of an output device that displays a second portion of the media asset with a second set of output parameters (smaller display size), in accordance with some embodiments of the disclosure.

In an embodiment, the second display size on the output device is lower than the first display size on the (same) output device, as illustrated in FIGS. 6 and 7, which show two representations of a media asset 600 being output on output device 102 connected to a user device (not represented in FIGS. 6 and 7). The first and second portions 604, 606 are shown as intervals of the media asset 600, which is itself represented by a seekbar 608 comprising a play position 610. In this embodiment, the actual size of the media asset 600 as it is being displayed on the output device 102 during a second portion 606 is smaller (in area) than the actual size of the media asset 600 as it is being displayed on the output device 102 for a first portion 604. In one approach, the second display size is less than 50% (in area) of the first display size. This enables the output device to generate a signal for fewer pixels and therefore to save some computing resource, and, thereby, some battery power. In addition, when the output device 102 allows a pixel-by-pixel control, unused pixels 612 of the output device 102 (which are hereby defined as pixels contributing to outputting the first portion 604 but not contributing to outputting of the second portion 606) may be shut off, thereby decreasing the consumption of power. Control circuitry generating for output the second portion 606 therefore includes turning off the unused pixels of the output device. Examples of such an output device include an OLED display device (e.g., Amoled®). This can for instance be performed in different situations: when the first portion 604 is being upscaled (i.e., the number of pixels is artificially increased); when the second portion 606 is being downscaled (i.e., the number of pixel is artificially decreased); and/or when the resolution is changed between the first set of output parameters and the second set of output parameters. These examples are described further below.

Still in relation to the embodiments of FIGS. 6 and 7, the second set of output parameters may in addition include a lower resolution than that of the first set of output parameters. As the second display size is reduced, there may be no need for the resource-saving system to maintain the same resolution, as the user might not be able to tell the difference. In practice, this is likely to happen, as reducing a display size is often accompanied with a reduced resolution.

For instance, when a first portion at a resolution of 1260p is being output on the full extent of a 1260p-ready output device (no upscale and no downscale), the display size of the second portion may be chosen in accordance with the second resolution: if the second resolution drops to 720p, then the 1260p-ready output device will output the second portion at 720p with no upscaling (i.e., one pixel of the output device corresponds to one pixel of the media asset) and therefore will display a smaller image, as shown in FIG. 7. Therefore, in one implementation, control circuitry may choose the second display size as a function of the second resolution.

When a first resolution is 1260p on a 1260p-ready output device (the first display size being the full extent of the output device and therefore no upscale and no downscale) and the second resolution is 1080p on the same output device, then the second display size may correspond to the number of pixels required to display a resolution of 1260p, hereby displaying a smaller image, as described in the previous paragraph. However, in some cases, the first portion may not be output at a display size that is adapted to the resolution of the output device and the first portion is upscaled to fit the resolution of the output device. For instance, when a first portion at a resolution of 720p is being output on the full extent of a 1260p-ready output device, the first portion may appear as pixelized, as several pixels of the 1260p-ready output device will be outputting the same pixels of a frame (e.g., an image) of the first portion (which is at a resolution 720p). In this case, a second display size may correspond to the resolution of the media asset and therefore to the actual number of pixels needed to display the second portion (no upscaling). Therefore, for a same resolution of the media asset between the first set of output parameters and the second set of output parameters, the display size may be changed between the first and the second portions.

As discussed previously, the first and second portions (with their respective first and second attributes) of the media asset determine the set of output parameters used. This means that the quality of the output is based on a selection of the portions of the media asset (that is to say which part of the media asset has the first attribute and which part has the second attribute).

In an embodiment, the first and second portions of the media asset are determined using a user's profile. The user's profile may contain preferences and/or a viewing history of the user. In another embodiment, the first and second portions of the media asset are determined based on metadata. In one implementation, the server device 322 (e.g., the media asset provider) may provide a media asset containing metadata for segments of the media asset (e.g., each scene of the media asset or at least some scenes). The metadata may be provided (e.g., added, incorporated) by a media asset generator (producer, movie studio, etc.) or by the server device 322 analyzing the media asset. In an implementation, the attribution of metadata is based on the length of a scene, the length of shots in the content, the presence of dialogue, the presence of a soundtrack, identification of a category of a scene (action, romance, dialogue, etc.), etc. This attribution may be performed on the fly, that is to say while the media asset is being output, or pre-performed, as described previously. A default attribution, in case no metadata can be specifically attributed to a scene, may be to define the scene as first portion or second portion.

The metadata of the media asset may be cross-referenced with the user's profile to determine which attribute is to be given for the segment, so that the segment is part of the first or second portion. For example, a user profile indicating a preference for action movies will lead to action scenes of a media asset being determined to be part of the first portion. Conversely, a user profile indicating no appeal for romance movies will lead to romance scenes of a media asset being part of the second portion.

Figure 8:
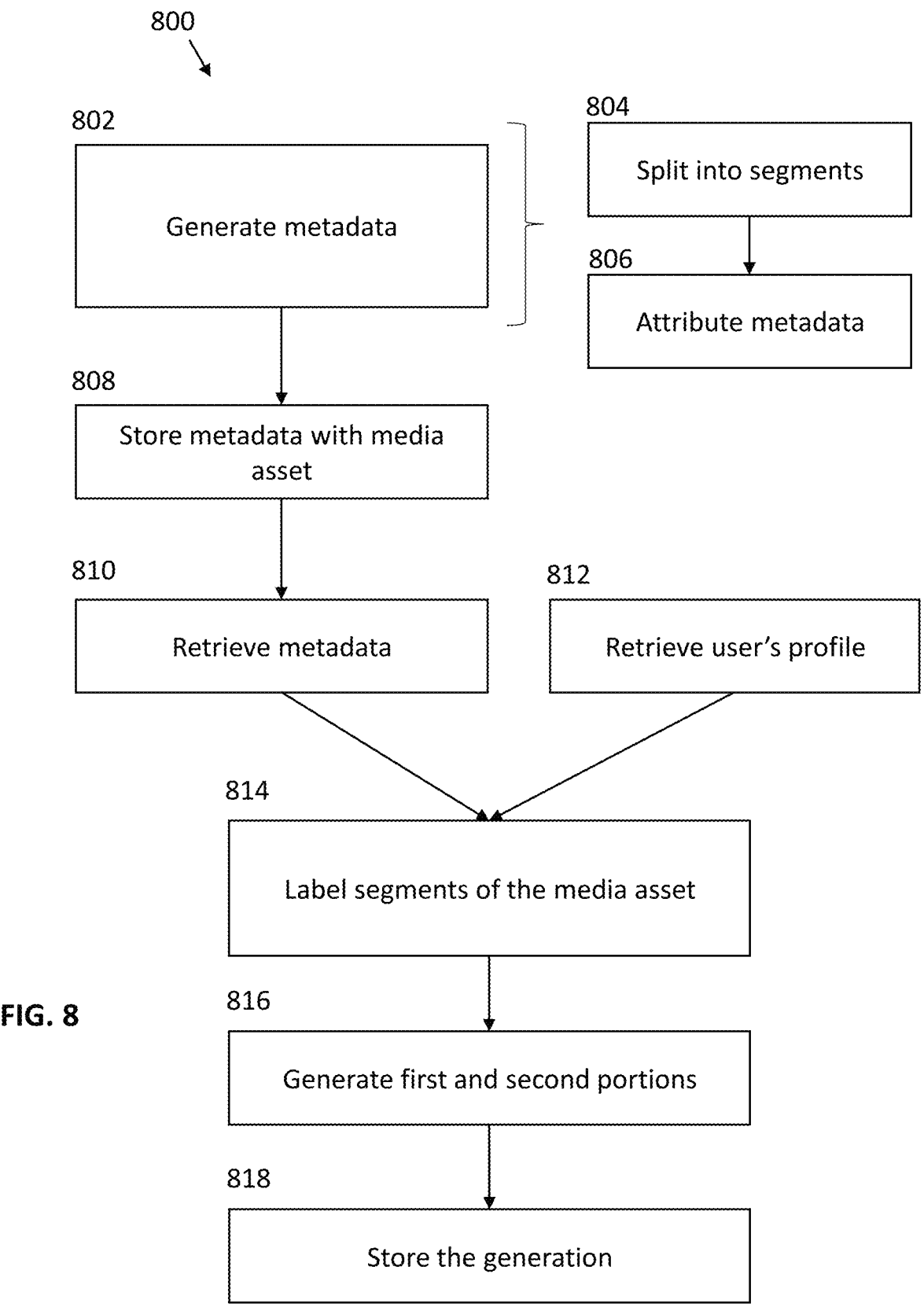
FIG. 8 is an illustrative flowchart of a process for determining the first and second portion of the media asset, in accordance with some embodiments of the disclosure.

FIG. 8 is a flowchart 800 illustrating how to determine the first and second portions of a media asset. At step 802, control circuitry generates metadata for the media asset, in particular for some scenes or sequences of the media asset (or all of them). Step 802 of generating metadata may be broken down as step 804 of splitting the media asset into segments and step 806 of attributing for each segment at least one metadata (e.g., action, love, car chase, dialogue, landscape, bright, gloomy, etc.). The metadata are those described above. At step 808, control circuitry stores the metadata with the media asset. These steps 802, 804, 806, 808 can be performed by the control circuitry 324 of the server device 322 or the control circuitry 304 of the user device 302. Those steps can advantageously be performed in advance, before receiving an input that a media asset is to be output. At step 810, control circuitry retrieves stored metadata of the media asset. At step 812, which may be carried out in parallel to steps 802 to 810, control circuitry retrieves the user's profile. The user's profile may be stored in storage 330 of the server device 322 or in storage 310 of the user device 302. At step 814, using the retrieved metadata and the user's profile, control circuitry combines for each segment of the media asset the attributed metadata and information from the user's profile to label each segment with a first attribute or a second attribute. The segments will form the segments described in relation to FIG. 5. At step 816, the first portion of the media asset, with the first attribute, and the second portion of the media asset, with the second attribute are generated, typically by concatenating the labelled segments of the media asset. Finally, at step 818, the generation of the first and second portions is stored, so that control circuitry may readily access them during playback, for instance for the steps 408, 410 of generating for output of FIG. 4. Typically, the generation of the first and second portions consists of an array comprising time intervals (the segments) associated with the label first attribute or second attribute. Similarly, steps 814 to 816 may be performed by the control circuitry 324 of the server device 322 or the control circuitry 304 of the user device 302. Steps 814 to 816 may be performed in response to retrieving an input that a media asset is to be output or is being output. In particular, in one implementation, steps 802-810 may be performed by the server device 322 while steps 812-816 may be performed by the user device 302. In another implementation, steps 802 to 816 are all performed by the server device 322. Determining that a first portion of the media asset has a first attribute and determining that a second portion of the media asset has a second attribute may therefore include retrieving the stored generation. Alternatively, if the generation is performed on the fly, then determining that a first portion of the media asset has a first attribute and determining that a second portion of the media asset has a second attribute may include the whole of process 800.

In one embodiment, generating for output the first portion comprises receiving, by control circuitry 304 of the user device 302, a media stream with a first quality. A media stream with a first quality enables the user device to output on the output device the first portion of the media asset with the first set of output parameters. In other words, that media stream contains enough data for the first portion to be displayed with the first set of output parameters. Generating for output the second portion comprises receiving, by control circuitry 304 of the user device 302, a media stream with the first quality as well but also includes processing the media stream with the first quality to generate for output the second portion with the second set of output parameters. In other words, switching from the first set of output parameters to the second set of output parameters is performed at the output stage (or the generation for output stage) and not at the media asset stage or the server device stage. For instance, in one implementation, the media stream is retrieved from the storage 310 of the user device 302 with a media stream of the first quality, and the set of output parameters is entirely determined by a media player of the user device. The media asset is typically stored with that first quality.

Figure 9:
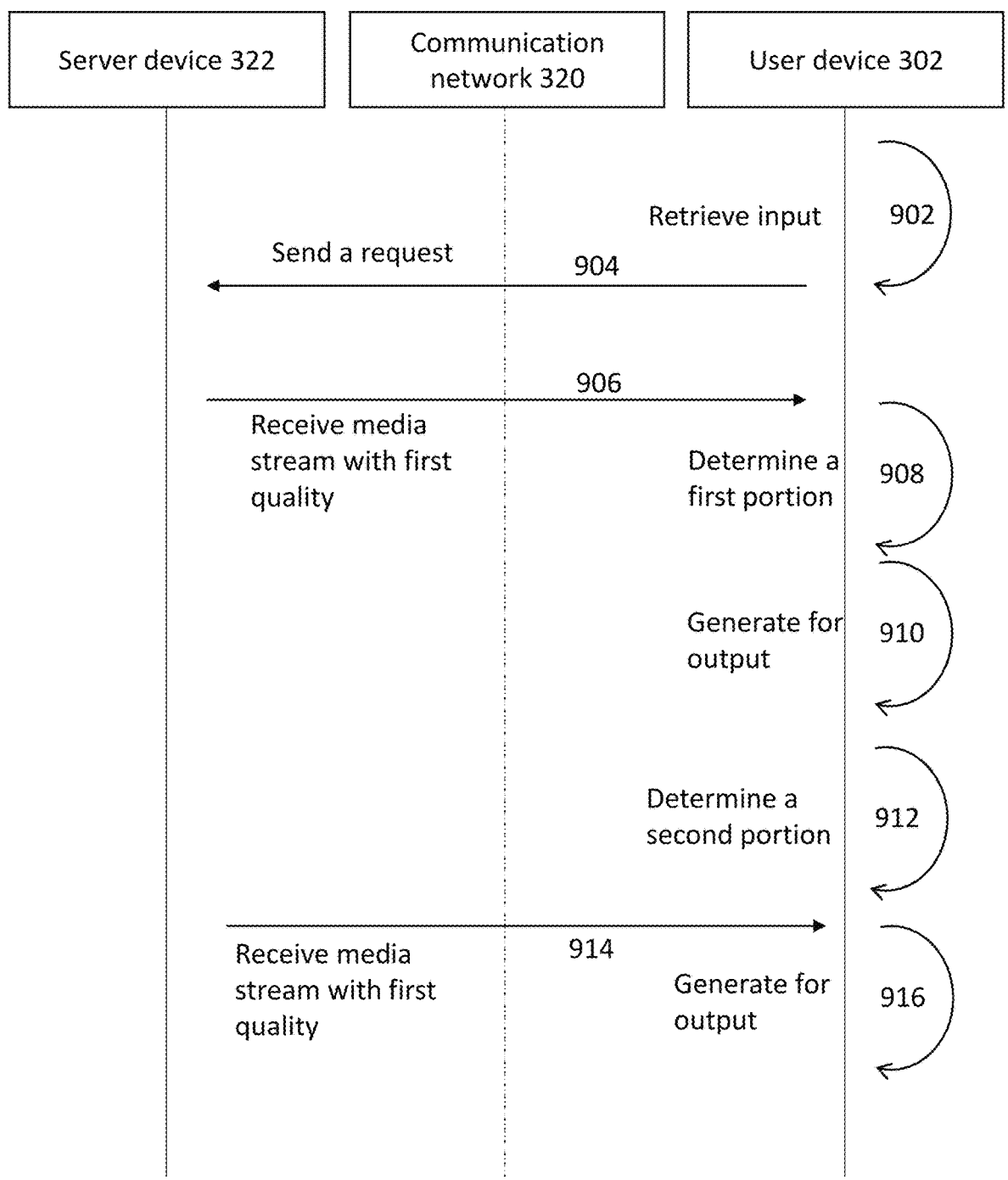
FIG. 9 is an illustrative diagram of a process for delivering the first portion and the second portion with a media stream of a first quality, in accordance with some embodiments of the disclosure.

In another implementation, illustrated by a flowchart of a process 900 in FIG. 9, the media stream is received by the user device 302 from the server device 322 via the communication network 320. At step 902, user device 302 receives an input requesting that a media asset be output on an output device to which the user device is connected. At step 904, the user device 302 sends a request to the server device 322 to stream the media asset. At step 906, the user device 302 receives a media stream with a first quality, along with the generated portions (see FIG. 8). In FIG. 9 it is assumed that the first portion and the second portion are entirely generated by the server device 322 and that, therefore, determining that a first portion has a first attribute and determining that a second portion has a second attribute comprises receiving by the user device 302 the relevant information from the server user device 322 (i.e., the generation stored at step 818). The media stream corresponds to transmitted data to output the media asset. At step 908, using the information about the portions, user device 302 may determine that the upcoming content is part of the first portion of the media asset, with the first attribute. At step 910, using the media stream received at 906, user device 302 generates for output the first portion of the media asset with the first set of output parameters. At step 912, user device 302 may determine, based on the information received with the media stream that is received continuously since step 906, that the upcoming content is part of the second portion of the media asset, with the second attribute, and, at step 914, keeps on receiving the media stream with the first quality. At step 916, user device 302 processes the media stream to generate for output the second portion with the second set of output parameters. In this embodiment, the media stream sent by the server device 322 and received by the user device 302 is of the first quality irrespective of whether the media stream relates to the first portion or the second portion. In an embodiment, user device 302 may generate for output parts of the media asset with the first set of output parameters (at step 910) or the second set of output parameters (at step 916) based on instructions of the server device 322. For instance, the instructions may be included in the information about the first and the second portions.

Figure 10:
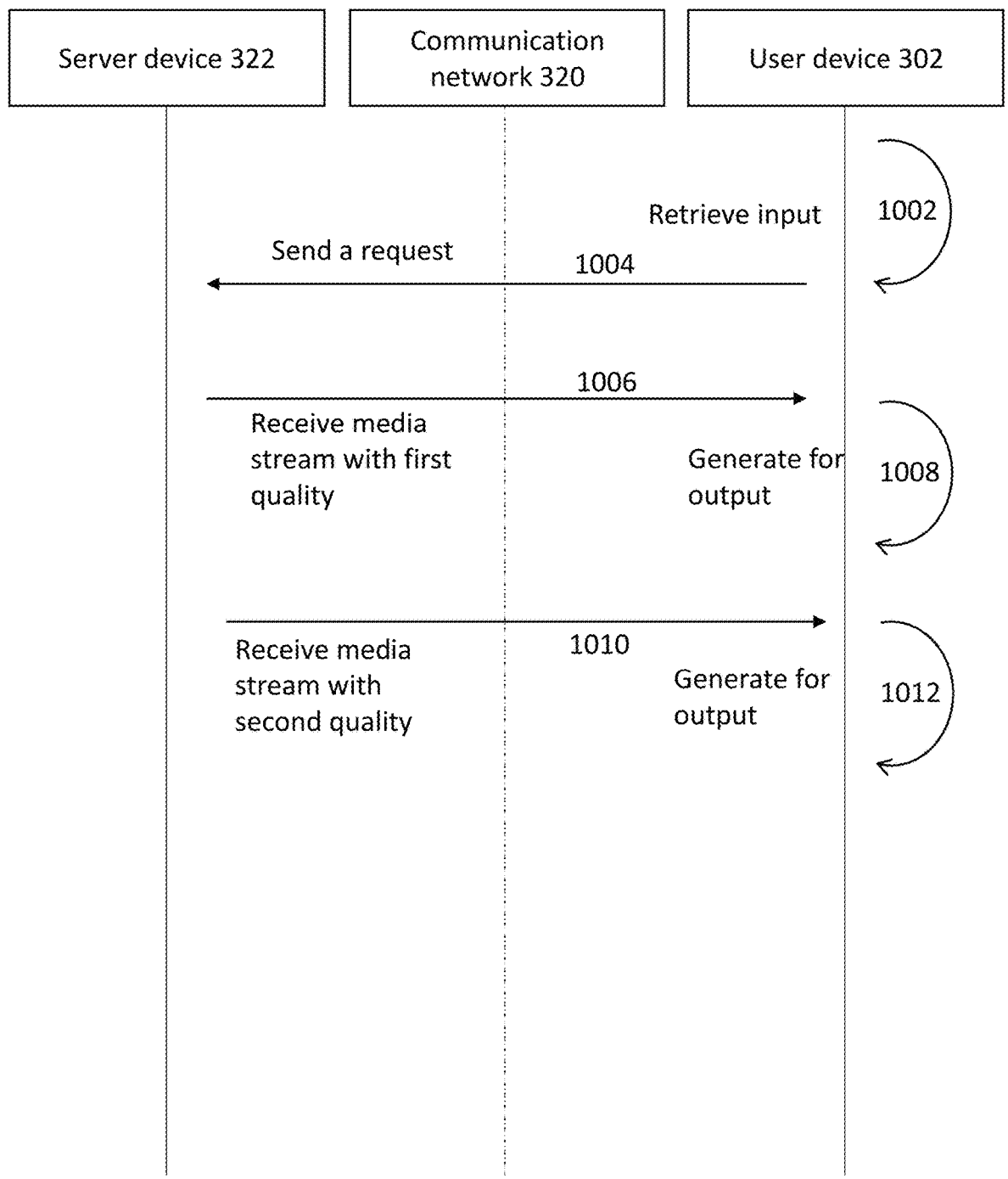
FIG. 10 is an illustrative diagram of a process for the user device receiving the first portion and the second portion respectively with a media stream of a first quality and a media stream of a second quality, in accordance with some embodiments of the disclosure.

In another embodiment, in which the media asset is streamed between the server device 322 and the user device 302, a media stream with the first quality may be used for the first portion and a media stream with a second quality may be used for the second portion. The media stream with the first quality, as indicated above, enables the user device to generate for output the first portion of the media asset with the first set of output parameters. The media stream with the second quality, however, enables the user device to generate for output the second portion of the media asset with the second set of output parameters and not with the first set of output parameters. The media stream with the second quality contains, therefore, less data than the media stream with the first quality. FIG. 10 illustrates an implementation by the user device 302, while FIG. 11 illustrates an implementation by the server device 322.

As illustrated by a flowchart of a process 1000 in FIG. 10, at step 1002, user device 302 receives an input requesting that a media asset be output on an output device to which the user device is connected. At step 1004, the user device 302 sends a request to the server device to stream the media asset. At step 1006, the user device 302 receives a media stream with a first quality along with information about the portions. This media stream corresponds to the first portion. In FIG. 10 it is assumed that the first portion and the second portion are entirely determined by the server device 322 and that, therefore, determining that a first portion has a first attribute and determining that a second portion has a second attribute comprises receiving by the user device 302 the relevant information from the server device 322 (i.e., the generation stored at step 818). The media stream corresponds to transmitted data to output the media asset. At step 1008, using the media stream with the first quality received at 1006, user device 302 generates for output the first portion of the media asset with the first set of output parameters. It is noted that the user device implicitly determines the first portion with the first attribute by receiving a media stream with the first quality. At step 1010, the user device receives a media stream with the second quality. This media stream corresponds to the second portion. At step 1012, using the media stream with the second quality received at 1010, user device 302 generates for output the second portion of the media asset with the second set of output parameters. It is noted that the user device implicitly determines the second portion with the second attribute by receiving a media stream with the first quality.

Figure 11:
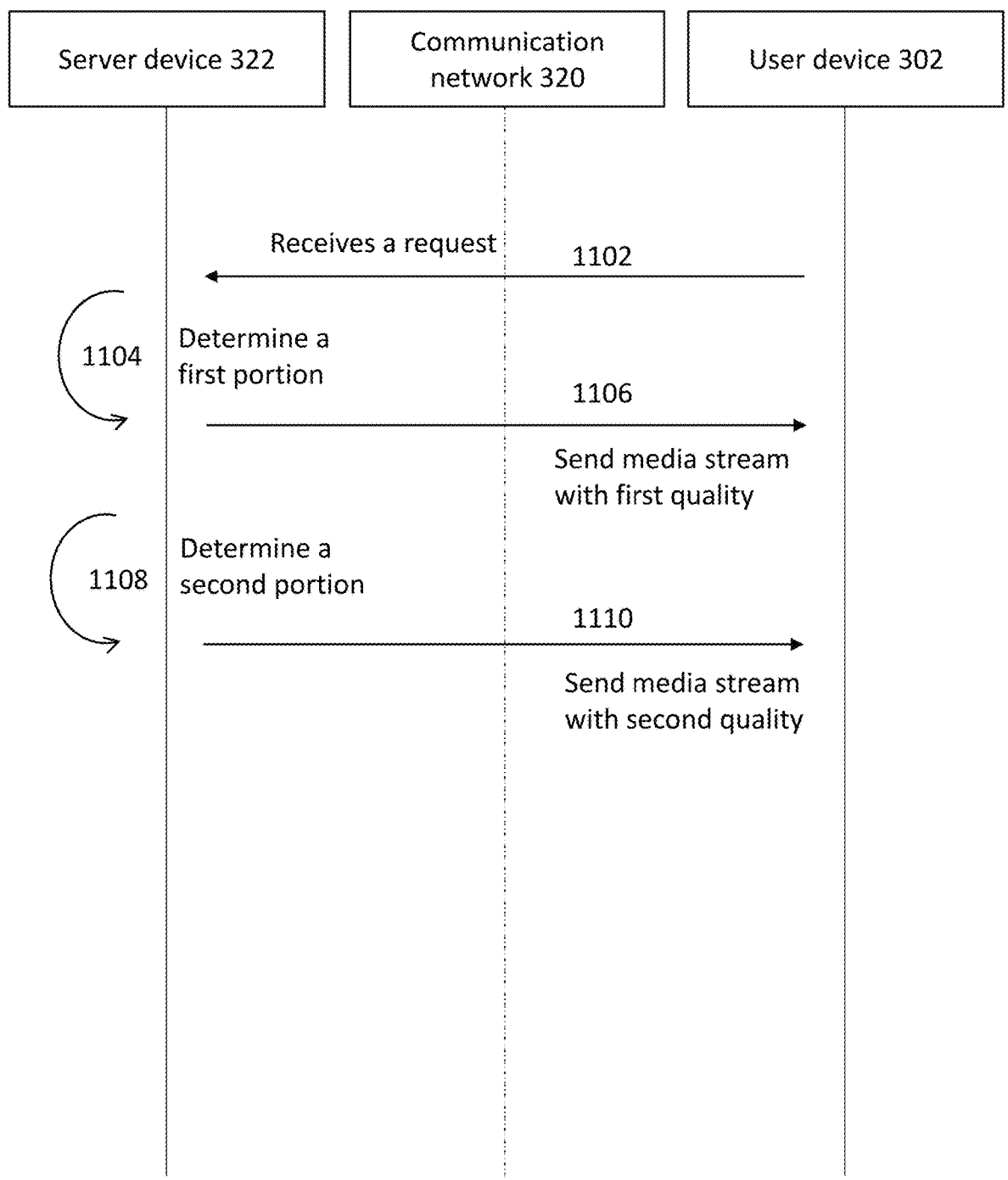
FIG. 11 is an illustrative diagram of a process for the remote server device delivering the first portion and the second portion respectively with a media stream of a first quality and a media stream of a second quality, in accordance with some embodiments of the disclosure.

As illustrated by a flowchart of a process 1100 in FIG. 11, at step 1102, server device 322 receives an input indicating that a media asset is to be output on an output device to which the user device is connected, which is, for instance, a request from the user device 302. At step 1104, the server device 332 determines that a first portion of the media asset has a first attribute. In FIG. 11, it is assumed that the first portion and the second portion are entirely determined by the server device 322 and therefore determining can be performed by retrieving the generation of the first and second portions (i.e., the generation stored at step 818). At step 1106, the server device 322 generates for output parts of the media asset with a first set of output parameters by sending the first portion as a media stream with the first quality. The recipient is the user device 302. At step 1108, the server device 332 determines that a second portion of the media asset has a second attribute. Again, this can be performed by retrieving the generation of the first and second portions (i.e., the generation stored at step 818). At step 1110, the server device 322 generates for output parts of the media asset with a first set of output parameters by sending the second portion as a media stream with the second quality. The recipient is the user device 302. This embodiment enables the reduction of the energy consumption of the user device 302, as the media stream with the second quality is easier to process, and reduction of the bandwidth used on the communication network 320, as the media stream with the second quality is lighter. This will be explained below in more detail.

The method of FIGS. 4, 9, 10, 11 may be performed when a resource-saving mode is activated. When the resource-saving mode is not activated, then the output of the media asset is carried out normally. When the resource-saving mode is activated, then the output of the media asset is carried out in accordance with any of the disclosures herein.

In an embodiment, the resource to save is an energy level, and particularly a battery level (e.g., smartphone, tablet, laptop running on battery and not being plugged in to an electrical network). In an implementation, switching from an inactivated resource-saving mode to an activated resource-saving mode may be performed upon reception of an input by a user. For instance, the user may decide that he or she does not want consuming the media asset to impact the battery too much (e.g., when spending a day without a charger). In another implementation, that switching is performed in response to the reception of battery level information. For instance, the resource-saving system may obtain a battery level information about a level of battery of the user device and may operate the resource-saving mode in response to obtaining that battery level information. In one approach concerning the battery level information, the resource-saving system may determine that the current battery level information is below a threshold battery level (for instance 20%). In another approach of the battery level information, the resource-saving system may determine that the predicted battery level will go below a threshold battery level during output of the media asset or upon completion of the media asset. For instance, the threshold may be 1% of battery remaining at the end of the media asset, or 10%, or 20%. As indicated above, in response to that determination, the resource-saving system activates the resource-saving mode. The predicted battery level approach enables the resource-saving system to ensure that the battery level of the user device will be sufficient to output the entirety of the media asset. For example, in a situation where the media asset contains a lot of data (either a long media asset, a high resolution, a high bitrate, a high frame rate, a maximum display size, etc.,) and the user device has a limited battery capacity, the resource-saving mode may be activated from the beginning of the media asset or when the battery level is still close to 100%.

Figure 12:
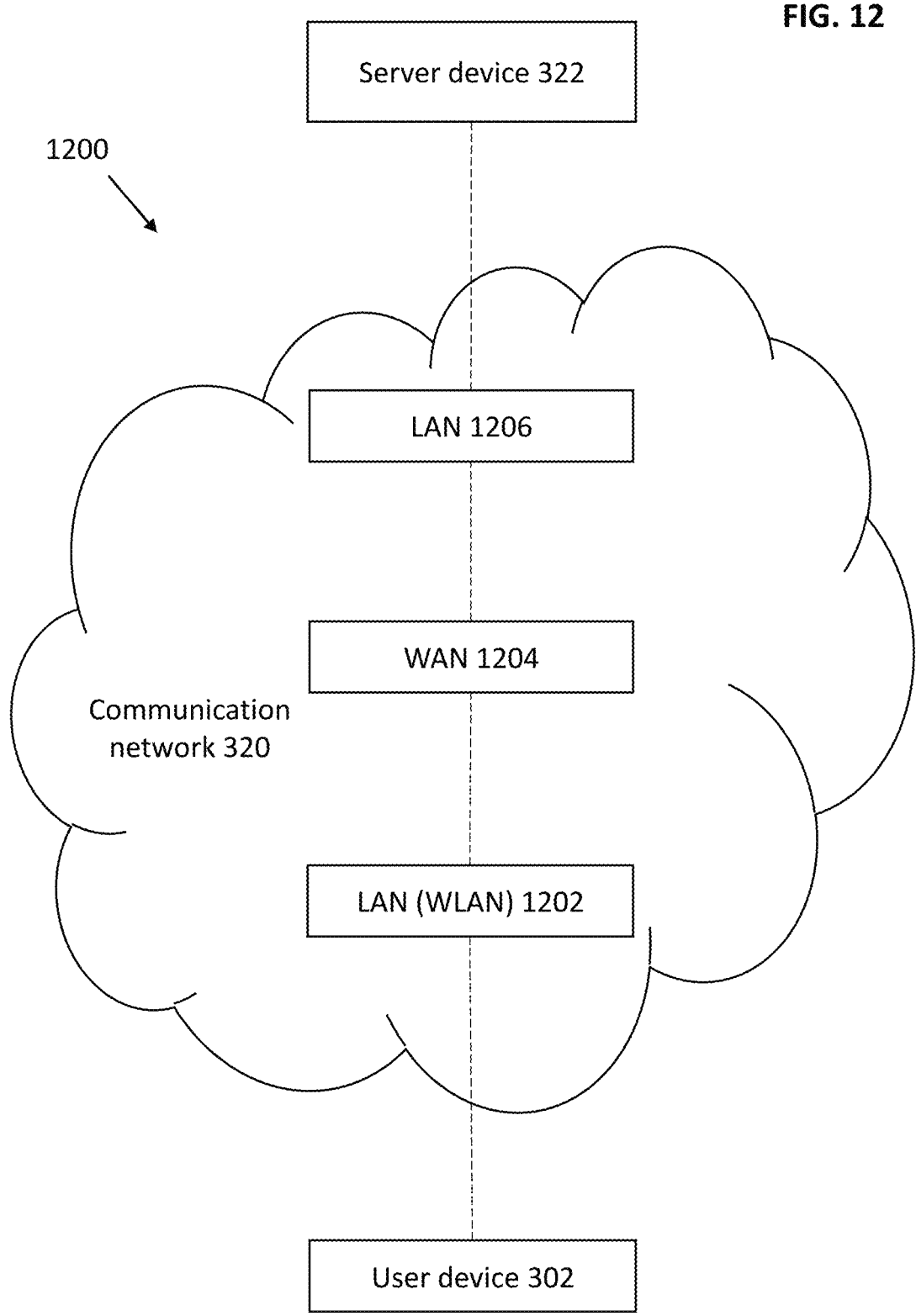
FIG. 12 is a more specific view of the illustrative topology of equipment (or computing configuration) programmed and configured for saving resources, in accordance with some embodiments of the disclosure.

In an embodiment, the resource to save is bandwidth. This implementation becomes relevant in the embodiments where the media asset is received from a remote server. In an implementation, switching from an inactivated resource-saving mode to an activated resource-saving mode may be performed upon reception of an input by a user. For instance, the user may decide that he or she does not want consuming the media asset to impact the bandwidth too much (e.g., when sharing the internet connection at home with the whole family). In another implementation, that switch is performed in response to the reception of bandwidth capacity information. For instance, the resource-saving system may obtain bandwidth capacity information about a capacity of the bandwidth to forward a certain amount of data and may, in response, operate the resource-saving mode. In one approach concerning the capacity of the bandwidth, the resource-saving system may determine that the current bandwidth capacity information is below a threshold bandwidth capacity (for instance 5 kbits/s). FIG. 12 represents a topology 1200 comprising the user device 302 and the server device 322 connected via the communication network 320. Topology 1200 comprises, to connect the user device 302 to the server device 322, a user connection point 1202 (connected to the user device 302), an internet-provider network 1204 (connected to the user connection point 1202) and a server connection point 1206 (connected to the internet-provider network 1204 and the server device 322). The bandwidth capacity may be that of the user connection point 1202 (e.g., LAN, WLAN, such as the local Wi-Fi connection), that of the internet-provider network 1204 (e.g., WAN, such as the town connection), or that of the media asset provider connection point 1206 (e.g., LAN such as the local network that connects the server device to the WAN 1204).

In an embodiment, the media asset is split into more than two portions (e.g., three or four portions) and to each portion is associated a set of output parameters that are different from one another. In a similar manner, more than one threshold may be defined for the battery level information and/or the bandwidth level information. For instance, a "light" resource-saving mode may be activated when a first threshold is reached. In the light resource-saving mode, a first and a second set of output parameters may be used. A "heavy" resource-saving mode may be activated when a second threshold is reached. In the heavy resource-saving mode, a first, a second and a third set of output parameters may be used, or only the second and third set of output parameters may be used.

The present disclosure also relates to methods and systems for decreasing consumption related to a user device outputting a media asset on an output device, using a screen shared with other users.

Figure 15:
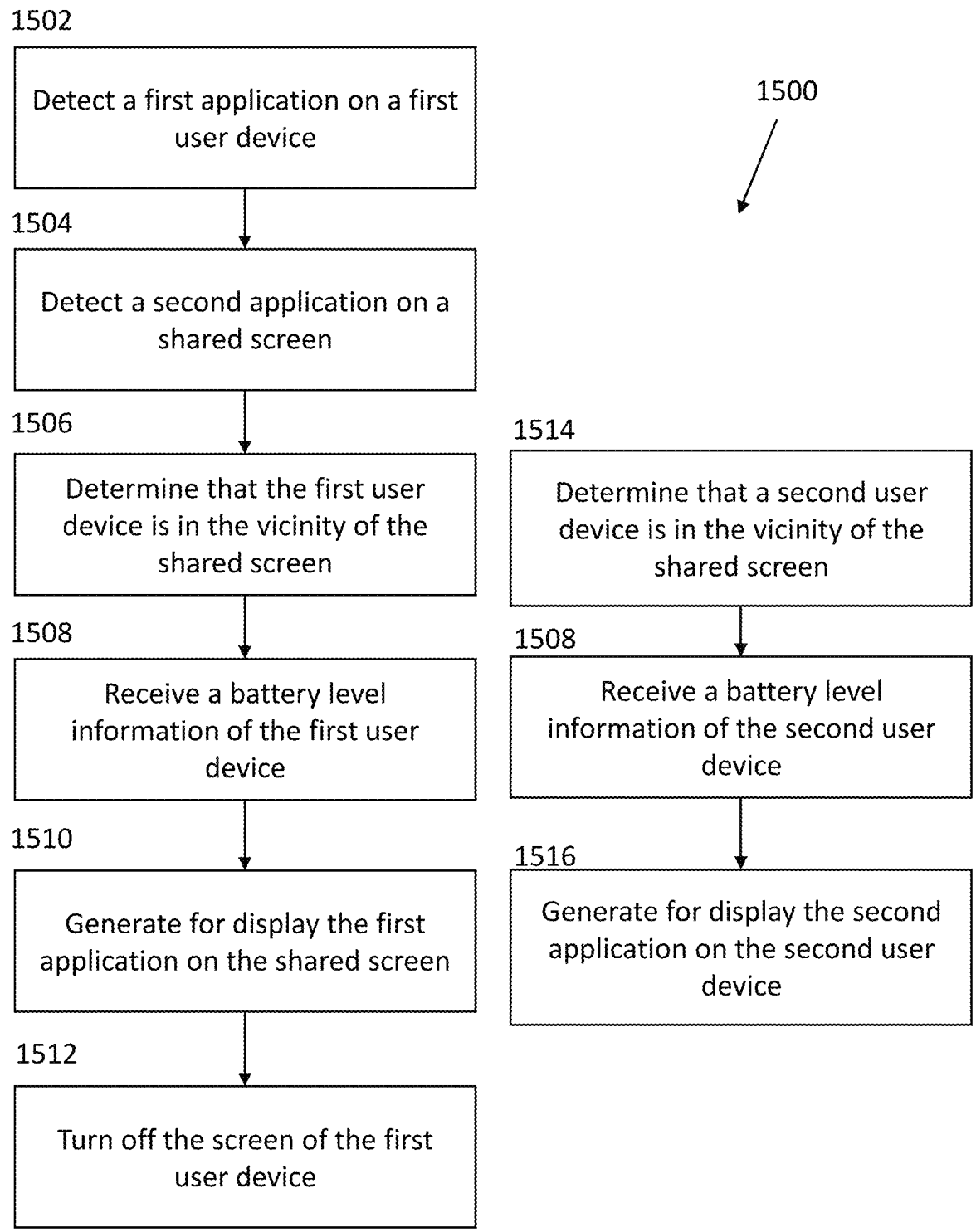
FIG. 15 is an illustrative flowchart of another process for saving resources, in accordance with some other embodiments of the disclosure.

FIGS. 13 and 14 illustrates a topology 1300, represented in a living room of a household, comprising a first user device 1302 (e.g., a smartphone or tablet) that is battery-powered and a shared screen 1304 (e.g., a television screen or computer screen) connected together via a communication network device 1306 (e.g., a WLAN router). The shared screen 1304 may be plugged into an electric network. The architecture 1300 may also comprise a second user device 1308, connected to the communication network device 1306 as well. FIG. 15 is an illustrative flowchart of a process 1500 for saving resources of a first user device, in accordance with some embodiments of the disclosure. At step 1502, a resource-saving system may detect that a first application 1310 is being displayed on the screen of the first user device 1302 (the arrows generally indicate what is being displayed on the devices). At step 1504, the resource-saving system may detect that a second application 1312 is being displayed on the shared screen 1304. The first and second applications 1310, 1312 may include any type of multimedia content that the user may view or with which the user may interact, such as a media asset (e.g., a series or a movies, pictures, a website or a smartphone application, etc.) or a messaging service (e.g., SMS, message over IP, etc.). The shared screen 1304 is a device that is usually shared between several users, such as a television or a tablet. In the present disclosure, "shared" means that the screen can be readily accessible by a first user (for instance a user using the first user device and consuming the first application) and a second user (for instance a user using the shared screen and consuming the second application). At step 1506, the resource-saving system may determine that the first user device 1302 in the vicinity of the shared screen 1304. For instance, the resource-saving system may retrieve a localization signal of the first user device 1302 and localization signal of the shared screen 1304, compute a distance and compare it to a threshold (the vicinity being defined as the distance being lower than the threshold). For instance, the resource-saving system may detect that both the first user device 1302 and the shared screen 1304 are connected to the communication network device 1306, which is typically a device of a local area network (LAN), such as a WLAN router, as mentioned above. At step 1508, the resource-saving system may receive battery level information of the first user device 1302. At step 1510, in response to determining that the battery level of the first user device is below a threshold, the resource-saving system generates for display the first application 1310 on the shared screen 1304 (see FIG. 14). The battery level may be determined using the battery level information. The threshold may be any percentage of the capacity of the battery, such as 20%. Ensuring that the first user device 1302 is in the vicinity of the shared screen 1304 means that the first user can easily access and view the shared screen 1304. In addition, at step 1512, the resource-saving system may generate instructions to turn off the screen of the first user device 1302 after the first application 1310 is to be displayed on the shared screen 1304. This ultimately preserves the battery level of the first user device 1302.

In an implementation also illustrated in FIGS. 13 and 14, at step 1514, the resource-saving system may determine that the second user device 1308 is in the vicinity of the shared screen 1304 as well, and, at step 1516, in response to generating for display the first application 1310 on the shared screen 1304, generates for display the second application 1312 on the second user device 1308. In this case, the shared screen 1304 no longer displays the second application 1312. Therefore, the second application 1312 is pushed away from the shared screen 1304 to the second user unit 1308 by the first application 1310. The resource-saving system may also receive, at step 1508, battery level information of the second user device and, upon determining that a battery level of the second user device 1308 is above a threshold, generate at step 1516 for display the second application 1312 on the second user device 1308. This ensures that the second user device 1308 has enough battery to display the second application 1312.

In another implementation, at step 1516, in response to determining that a battery level of the first user device is below a threshold, the resource-saving system may generate for display the second application on the shared screen such that both the first and the second applications are displayed on the shared screen. For instance, the shared screen may be split in half.

In an embodiment, there may be several shared screens that can potentially be used to display the first application, among which there are screens that are battery-powered and screen that are electrically plugged in. The choice of a shared screen may be based on the type of the first application of the first user device. For instance, a first application that is battery-consuming, such as a media asset (e.g., movie), may be displayed on a shared screen that is plugged in while a first application that is not battery-consuming, such as a messaging service, may be displayed on a shared screen that is battery-powered.

Figure 16:
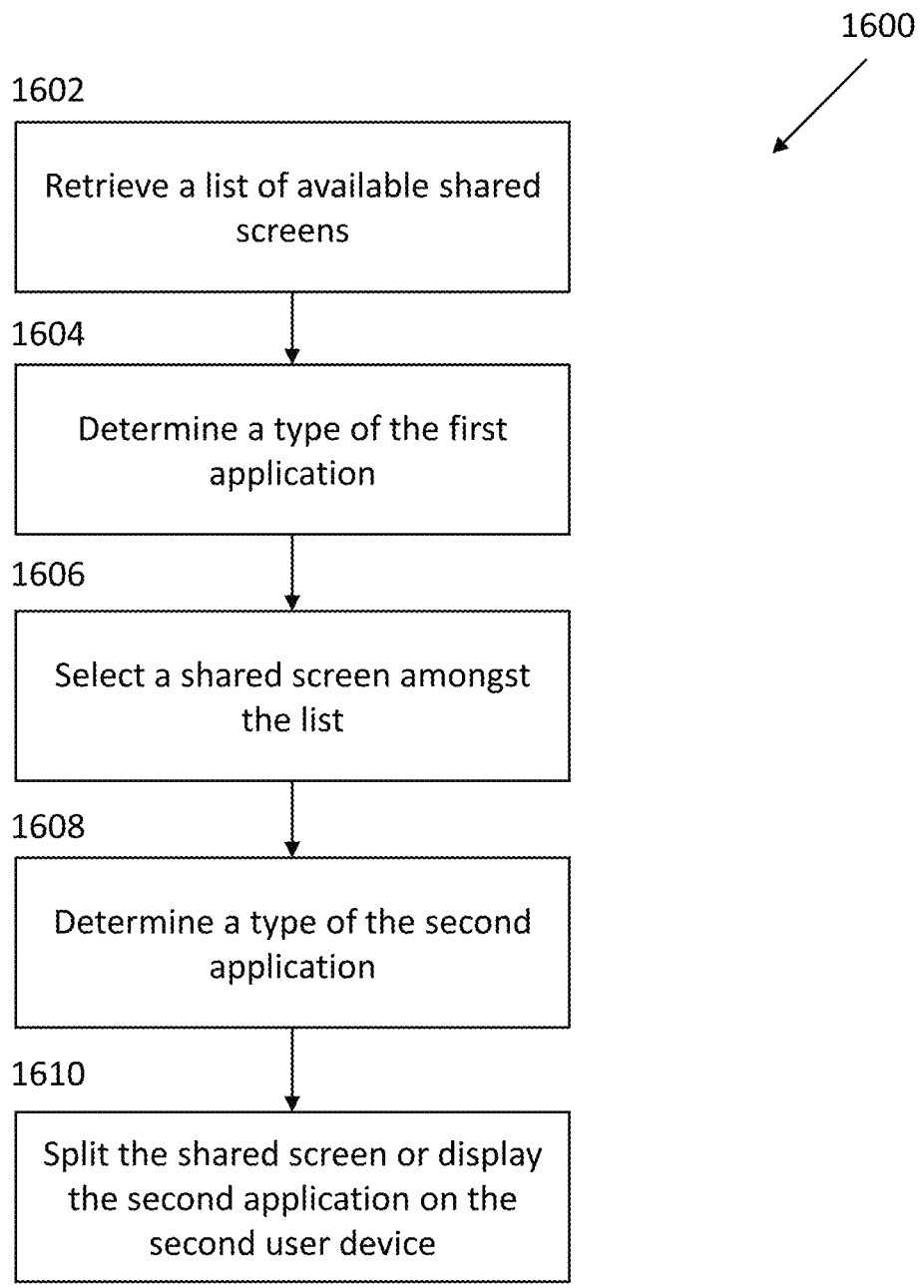
FIG. 16 is an illustrative flowchart of a process for managing the user devices and the shared screen, in accordance with some embodiments of the disclosure.

FIG. 16 is an illustrative flowchart of a process 1600 for selecting a shared screen. At step 1602, the resource-saving system may retrieve a list of available shared screens that are in the vicinity of the first user device. At step 1604, the resource-saving system may determine a type of the first application and, at step 1606, based on the determined type, the resource-saving system may select a shared screen among the list. This selected shared screen then displays the first application in step 1510. In a similar manner, at step 1608, the resource-saving system may determine a type of the second application and, at step 1610, based on the determined type, the resource-saving system may either split the shared screen and display both the first and second applications (e.g., non-private use, high-power consuming application) or may generate for the display the second application on the second user device (e.g., private use, low resource-consuming application).

The computing configuration may be similar to that of FIG. 3, with the first user, the second device and the shared screen being similar to the user device 302 and the communication network device 1306 being part of the communication network 320. The computing configuration may also include a home device, such as a set top box, connected to the first user device, the second user device and the shared screen via the communication network 320 (in particular the communication network device 1306). The network device 1306 may a LAN router, such as a WLAN router, or a WAN router. Applications may be stored in a user device storage and in a server storage. The resource-saving system may include control circuitry of the first device, the second device, the communication network device, the home device and/or the server device. In one embodiment, the resource-saving system may be distributed over the user devices and/or the home device. In one embodiment, the resource-saving system may be included in the first user device and send instructions to the shared screen and the second user device.

The methods and/or any instructions for operating any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory ("RAM"), etc.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for decreasing consumption of resources related to a first user device outputting a first application, the method comprising operating a resource-saving mode comprising:

detecting that the first application is displayed on a first user device which is battery-powered;

identifying that the first application has a high battery consumption;

determining that the first user device is in the vicinity of a plurality of shared screens having different types; and in response to determining that the first user device is in the vicinity of the plurality of shared screens and that a battery level of the first user device is below a threshold:

identifying, based on the first application having a high battery consumption, a shared screen of a first type from the plurality of shared screens; and generating for display the first application on the identified shared screen of the first type.

2. The method of claim 1, further comprising:

detecting that a second application is displayed on the shared screen;

determining that a second user device is in the vicinity of the shared screen; and, in response to determining that the battery level of the first user device is below the threshold, generating for display the second application on the second user device.

3. The method of claim 1, further comprising:

detecting that a second application is displayed on the shared screen; and in response to determining that the first user device is in the vicinity of the shared screen and that the battery level of the first user device is below the threshold, generating for display both the first application and the second application on the shared screen.

4. The method of claim 1, further comprising:

retrieving a list of available shared screens;

determining a type of the first application on the first user device; and based on the determined type, selecting the shared screen among the list to display the first application.

5. The method of claim 4, wherein:

the list of available shared screens comprises a battery-powered screen;

the type of the first application is messaging; and selecting the shared screen further comprises selecting the battery-powered screen; or the list of available shared screens comprises a plugged in screen;

the type of the first application is media player; and selecting the shared screen further comprises selecting the plugged in screen.

6. The method of claim 1, further comprising:

detecting that a second application is displayed on the shared screen determining a first type of the first application on the first user device;

determining a second type of the second application on the shared screen; and wherein generating for display the first application on the shared screen further comprises determining, based on the first and second types, whether to:

display the first and the second application in a split display mode on the shared screen; or display the first application on the shared screen and the second application on a second user device.

7. The method of claim 1, further comprising, in response to displaying the first application on the shared screen, turning off a screen of the first user device.

8. The method of claim 1, further comprising:
retrieving a list of available shared screens, the list being sorted in a predetermined order;
determining that the shared screen is not available for displaying the first application in response to determining that the battery level of the first user device is below the threshold; and
selecting another shared screen in the list of available shared screens according to the predetermined order.

9. The method of claim 1, wherein determining that the first user device is in the vicinity of the shared screen further comprises:
retrieving a first localization signal of the first computing device;
retrieving a second localization signal of the shared screen;
computing, based on the retrieved first and second localization signals, a distance between the first computing device and the shared screen;
comparing the computed distance to a threshold distance; and
determining that the first user device is in the vicinity of the shared screen if the computed distance is lower than the threshold distance.

10. The method of claim 1, wherein determining that the first user device is in the vicinity of the shared screen further comprises determining that the first user device and the shared screen are connected to the same network.

11. A system for decreasing consumption of resources related to a first user device outputting a first application, the system comprising:
a communication port;
a memory storing instructions; and
control circuitry communicably coupled to the memory and the communication port and configured to execute instructions to, when operating a resource-saving mode:
detect that the first application is displayed on a first user device which is battery-powered;
identify that the first application has a high battery consumption;
determine that the first user device is in the vicinity of a plurality of shared screens having different types; and
in response to determining that the first user device is in the vicinity of the plurality of shared screens and that a battery level of the first user device is below a threshold:
identify, based on the first application having a high battery consumption, a shared screen of a first type from the plurality of shared screens; and
generate for display the first application on the identified shared screen of the first type.

12. The system of claim 11, wherein the control circuitry is further configured to:
detect that a second application is displayed on the shared screen;
determine that a second user device is in the vicinity of the shared screen; and,
in response to determining that the battery level of the first user device is below the threshold, generate for display the second application on the second user device.

13. The system of claim 11, wherein the control circuitry is further configured to:
detect that a second application is displayed on the shared screen; and
in response to determining that the first user device is in the vicinity of the shared screen and that the battery level of the first user device is below the threshold, generate for display both the first application and the second application on the shared screen.

14. The system of claim 11, wherein the control circuitry is further configured to:
retrieve a list of available shared screens;
determine a type of the first application on the first user device; and
based on the determined type, select the shared screen among the list to display the first application.

15. The system of claim 14, wherein:
the list of available shared screens comprises a battery-powered screen;
the type of the first application is messaging; and
the control circuitry configured to select the shared screen is further configured to select the battery-powered screen; or
the list of available shared screens comprises a plugged in screen;
the type of the first application is media player; and
the control circuitry configured to select the shared screen is further configured to select the plugged in screen.

16. The system of claim 11, wherein the control circuitry is further configured to:
detect that a second application is displayed on the shared screen;
determine a first type of the first application on the first user device;
determine a second type of the second application on the shared screen; and
wherein the control circuitry configured to generate for display the first application on the shared screen is further configured to determine, based on the first and second types, whether to:
display the first and the second application in a split display mode on the shared screen; or
display the first application on the shared screen and the second application on a second user device.

17. The system of claim 11, wherein the control circuitry is further configured to, in response to displaying the first application on the shared screen, turn off a screen of the first user device.

18. The system of claim 11, wherein the control circuitry is further configured to:
retrieve a list of available shared screens, the list being sorted in a predetermined order;
determine that the shared screen is not available for displaying the first application in response to determining that the battery level of the first user device is below the threshold; and
select another shared screen in the list of available shared screens according to the predetermined order.

19. The system of claim 11, wherein the control circuitry configured to determine that the first user device is in the vicinity of the shared screen is further configured to:
retrieve a first localization signal of the first computing device;
retrieve a second localization signal of the shared screen;
compute, based on the retrieved first and second localization signals, a distance between the first computing device and the shared screen;
compare the computed distance to a threshold distance; and determine that the first user device is in the vicinity of the shared screen if the computed distance is lower than the threshold distance.

20. The system of claim 11, wherein the control circuitry configured to determine that the first user device is in the vicinity of the shared screen is further configured to determine that the first user device and the shared screen are connected to the same network.

\* \* \* \* \*